US012172679B2

(12) United States Patent
Fontiveros Penso et al.

(10) Patent No.: US 12,172,679 B2
(45) Date of Patent: Dec. 24, 2024

(54) GAP BLOCKING SYSTEMS AND METHODS FOR AMUSEMENT PARK ATTRACTIONS

(71) Applicant: Universal City Studios LLC, Universal City, CA (US)

(72) Inventors: Maria Carlota Fontiveros Penso, Miami Springs, FL (US); Rachel Sarah Wilcox, Orlando, FL (US); Robert William Dannenfelser, Jr., Oviedo, FL (US); James Anthony Bertoncello, Orlando, FL (US); Michael David Russell, Jr., Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/474,681

(22) Filed: Sep. 26, 2023

(65) Prior Publication Data
US 2024/0010244 A1    Jan. 11, 2024

Related U.S. Application Data

(62) Division of application No. 16/692,920, filed on Nov. 22, 2019, now Pat. No. 11,787,447.
(Continued)

(51) Int. Cl.
*B61B 1/02* (2006.01)
*A63G 4/00* (2006.01)
(Continued)

(52) U.S. Cl.
CPC ............... *B61B 1/02* (2013.01); *A63G 4/00* (2013.01); *A63G 31/00* (2013.01); *A63G 31/02* (2013.01);
(Continued)

(58) Field of Classification Search
CPC ........... B61B 1/02; B61B 10/00; A63G 31/02; A63G 4/00; E06B 11/025; B61L 1/00; B61L 1/04
(Continued)

(56) References Cited

U.S. PATENT DOCUMENTS

| 368,420 A | 8/1887 | Pearsons |
| 922,052 A | 5/1909 | Sherk |

(Continued)

FOREIGN PATENT DOCUMENTS

| CN | 102309853 A | 1/2012 |
| CN | 103153412 A | 6/2013 |

(Continued)

OTHER PUBLICATIONS

JP Office Action for Japanese Application No. 2021-557891 mailed Dec. 27, 2023.
(Continued)

*Primary Examiner* — S. Joseph Morano
*Assistant Examiner* — James William Jones
(74) *Attorney, Agent, or Firm* — Fletcher Yoder P.C.

(57) ABSTRACT

A gap blocking system includes a loading platform having a gap separating a first portion of the loading platform from a second portion of the loading platform. A ride vehicle is coupled to a transport extending through the gap. A guardrail assembly having a plurality of guardrail units is coupled to the first portion, where the guardrail units are configured to transition between a first position and a second position. The guardrail units are configured to block access to the gap when in the first position. The ride vehicle includes an engagement feature configured to interface with an individual guardrail unit of the guardrail units to selectively transition the individual guardrail unit from the first position to the second position. The individual guardrail unit is
(Continued)

configured to permit the ride vehicle to occupy a guest-accessible position adjacent to or on the loading platform in the second position.

8 Claims, 10 Drawing Sheets

Related U.S. Application Data

(60) Provisional application No. 62/858,663, filed on Jun. 7, 2019, provisional application No. 62/849,542, filed on May 17, 2019, provisional application No. 62/827,144, filed on Mar. 31, 2019.

(51) Int. Cl.

| | | |
|---|---|---|
| *A63G 31/00* | (2006.01) | |
| *A63G 31/02* | (2006.01) | |
| *B60R 21/01* | (2006.01) | |
| *B61B 3/00* | (2006.01) | |
| *B61L 1/00* | (2006.01) | |
| *B61L 1/04* | (2006.01) | |
| *A63G 31/16* | (2006.01) | |
| *B60R 21/00* | (2006.01) | |

(52) U.S. Cl.
CPC ............. *B60R 21/01* (2013.01); *B61B 3/00* (2013.01); *B61L 1/00* (2013.01); *B61L 1/04* (2013.01); *A63G 31/007* (2013.01); *A63G 31/16* (2013.01); *B60R 2021/0097* (2013.01)

(58) Field of Classification Search
USPC ........................................ 104/146, 30, 31
See application file for complete search history.

(56) References Cited

U.S. PATENT DOCUMENTS

| | | | |
|---|---|---|---|
| 929,130 A | 7/1909 | Helliesen | |
| 1,098,298 A | 5/1914 | Porth | |
| 1,116,160 A | 11/1914 | Swedberg | |
| 1,216,560 A * | 2/1917 | Gallinant | B61B 1/02 |
| | | | 104/31 |
| 1,531,118 A | 3/1925 | McManus | |
| 2,168,061 A | 8/1939 | Christie et al. | |
| 3,095,216 A | 6/1963 | Browne et al. | |
| 3,727,558 A | 4/1973 | Winkle | |
| 3,730,361 A | 5/1973 | Haynes | |
| 3,791,308 A | 2/1974 | Hartz | |
| 3,865,041 A | 2/1975 | Bacon | |
| 4,308,697 A | 1/1982 | Guppy | |
| 4,347,791 A | 9/1982 | Mandros | |
| 4,369,984 A | 1/1983 | Hagen | |
| 4,488,326 A | 12/1984 | Cherry | |
| 4,543,886 A | 10/1985 | Spieldiener et al. | |
| 4,694,522 A | 9/1987 | Alten | |
| 4,759,682 A | 7/1988 | Hood | |
| 5,033,392 A | 7/1991 | Schemitsch | |
| 5,150,659 A | 9/1992 | Bickel | |
| 5,161,104 A | 11/1992 | Fox et al. | |
| 5,197,923 A | 3/1993 | Barber | |
| 5,357,869 A | 10/1994 | Barjolle et al. | |
| 5,453,053 A | 9/1995 | Danta et al. | |
| 5,463,962 A | 11/1995 | Gnezdilov | |
| 5,558,198 A | 9/1996 | Juarez | |
| 5,560,468 A | 10/1996 | Inoue | |
| 5,810,147 A | 9/1998 | Vanmoor | |
| 5,832,555 A | 11/1998 | Saucier et al. | |
| 5,845,580 A | 12/1998 | Muller et al. | |
| 5,845,582 A | 12/1998 | Coester et al. | |
| 5,931,288 A | 8/1999 | Avery | |
| 5,994,644 A | 11/1999 | Rindoks et al. | |
| 6,220,171 B1 | 4/2001 | Hettema et al. | |
| 6,352,034 B1 | 3/2002 | Bolliger et al. | |
| 6,440,002 B1 | 8/2002 | Jackson | |
| 6,595,344 B1 | 7/2003 | Davis et al. | |
| 6,880,301 B2 | 4/2005 | Hahn et al. | |
| 6,898,816 B2 | 5/2005 | Tholen et al. | |
| 7,354,351 B2 | 4/2008 | Edwards | |
| 7,762,895 B2 | 7/2010 | Zamperla et al. | |
| 7,784,405 B2 * | 8/2010 | Rose ........................ | A63G 7/00 |
| | | | 104/31 |
| 7,802,337 B2 | 9/2010 | van Roosmalen et al. | |
| 7,802,521 B2 | 9/2010 | Gunes | |
| 7,908,976 B2 | 3/2011 | Pujol | |
| 8,020,496 B1 | 9/2011 | Maysonet | |
| 8,141,495 B2 | 3/2012 | Baker et al. | |
| 8,375,864 B1 | 2/2013 | Crawford et al. | |
| 8,556,283 B2 | 10/2013 | Coochesfahani | |
| 8,601,953 B2 | 12/2013 | Hachet et al. | |
| 9,505,330 B2 | 11/2016 | Hirtenlehner et al. | |
| 9,932,045 B2 | 4/2018 | Geddie et al. | |
| 10,065,123 B2 | 9/2018 | Zamperla | |
| 10,099,708 B2 | 10/2018 | Krueger | |
| 10,106,069 B2 | 10/2018 | Rasekhi | |
| 10,183,844 B1 | 1/2019 | Howes | |
| 10,279,274 B1 | 5/2019 | Brister et al. | |
| 10,427,059 B1 | 10/2019 | Goddard et al. | |
| 10,800,435 B2 | 10/2020 | Shi et al. | |
| 2001/0042489 A1 | 11/2001 | Yamaguchi et al. | |
| 2003/0070576 A1 | 4/2003 | Vicent-Genod | |
| 2008/0134930 A1 | 6/2008 | Drago | |
| 2009/0017927 A1 | 1/2009 | Shozi et al. | |
| 2009/0120319 A1 | 5/2009 | Muller et al. | |
| 2009/0272289 A1 | 11/2009 | Baker et al. | |
| 2010/0043664 A1 | 2/2010 | Winkelmann et al. | |
| 2010/0058949 A1 | 3/2010 | Lomberty et al. | |
| 2010/0078291 A1 * | 4/2010 | Fritsche .................. | B66B 21/10 |
| | | | 198/324 |
| 2010/0282121 A1 | 11/2010 | Switzeny | |
| 2010/0308294 A1 * | 12/2010 | Watkins ................ | E06B 11/025 |
| | | | 256/73 |
| 2013/0059670 A1 | 3/2013 | Crawford et al. | |
| 2016/0207542 A1 * | 7/2016 | Lieber ..................... | B61B 1/02 |
| 2017/0240356 A1 | 8/2017 | Benedict | |
| 2018/0016809 A1 * | 1/2018 | Hyland .................. | E06B 11/00 |
| 2018/0339672 A1 | 11/2018 | Kubiak et al. | |
| 2019/0070515 A1 | 3/2019 | Grogan et al. | |
| 2019/0239587 A1 | 8/2019 | Klein-Kassab | |
| 2022/0266875 A1 | 8/2022 | Laffin | |

FOREIGN PATENT DOCUMENTS

| | | |
|---|---|---|
| CN | 203543951 U | 4/2014 |
| CN | 105555617 A | 5/2016 |
| CN | 107073337 A | 8/2017 |
| DE | 3142790 A1 | 5/1983 |
| EP | 1201280 B1 | 4/2008 |
| EP | 2295123 A1 | 3/2011 |
| JP | S4821479 A | 6/1973 |
| JP | H09108090 A | 4/1997 |
| JP | 2003182564 A | 7/2003 |
| JP | 2004268634 A | 9/2004 |
| JP | 4167132 B2 | 10/2008 |
| JP | 2008279942 A | 11/2008 |
| JP | 5401084 B2 | 1/2014 |
| JP | 2016074313 A | 5/2016 |
| KR | 20010082872 A | 8/2001 |
| WO | 2005007479 A1 | 1/2005 |
| WO | 2005077479 A1 | 8/2005 |
| WO | 2005108161 A1 | 11/2005 |
| WO | 2010027239 A2 | 3/2010 |
| WO | 2017201435 A1 | 11/2017 |

OTHER PUBLICATIONS

JP Office Action for Japanese Application No. 2021-558804 mailed Feb. 8, 2024.
Accessible Amusement Rides—A Summary of Accessibility Guidelines, United States Access Board, Jun. 2003, 18 pgs.

(56) References Cited

OTHER PUBLICATIONS

Platform Gap Filler, Website: https://en.wikipedia.org/wiki/Platform_gap_filler, pp. 1-3 (Accessed on Nov. 1, 2017).
PCT/US2020/018774 International Search Report and Written Opinion Jun. 25, 2020.
PCT/US2020/021192 International Search Report and Written Opinion May 27, 2020.
PCT/US2020/021092 International Search Report and Written Opinion May 27, 2020.
SG 111202109767R Search Report dated Jun. 28, 2022.
SG Office Action for Singapore Application No. 11202109772V mailed Mar. 13, 2023.
CN Office Action for Chinese Application No. 202080026434.2 mailed Mar. 13, 2024.
CN Office Action for Chinese Application No. 202080026435.7 mailed Mar. 18, 2024.

* cited by examiner

GAP BLOCKING SYSTEMS AND METHODS FOR AMUSEMENT PARK ATTRACTIONS

CROSS-REFERENCE TO RELATED APPLICATIONS

This application is a divisional of U.S. patent application Ser. No. 16/692,920, filed on Nov. 22, 2019, which claims priority to and the benefit of U.S. Provisional Application No. 62/827,144, entitled "FALL HAZARD PREVENTION SYSTEMS FOR AMUSEMENT PARK ATTRACTIONS," filed Mar. 31, 2019, U.S. Provisional Application No. 62/849,542, entitled "FALL HAZARD PREVENTION SYSTEMS FOR AMUSEMENT PARK ATTRACTIONS," filed May 17, 2019, and U.S. Provisional Application No. 62/858,663, entitled "FALL HAZARD PREVENTION SYSTEMS FOR AMUSEMENT PARK ATTRACTIONS," filed Jun. 7, 2019, which are hereby incorporated by reference in their entireties for all purposes.

BACKGROUND

The present disclosure relates generally to amusement park ride systems for amusement parks. More particularly, embodiments of the present disclosure relate to systems and methods for blocking access to gaps in certain amusement park ride systems.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Recently, there has been a growing interest in increasing an efficiency of loading passengers (e.g., guests) into ride vehicles of attractions of amusement parks. Accordingly, some attractions may include a loading system having a loading platform that permits passengers to unload from a ride vehicle and/or to load into the ride vehicle while the ride vehicle moves along a loading path. Certain locations along the loading platform are typically permanently blocked with barriers (e.g., railing) to prevent guests from moving out of the loading platform and onto, for example, a track of the attraction or another location where the guests should not be. Other locations along the loading platform may include uncovered gaps that are not permanently blockable with barriers. For example, such uncovered gaps generally permit the ride vehicle and/or components propelling the ride vehicle to travel along the loading path without interference with the loading platform. However, passengers loading/unloading from the ride vehicle and/or other guests walking across the loading platform may lose items in such uncovered gaps along the loading platform.

SUMMARY

Certain embodiments commensurate in scope with the present disclosure are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a gap blocking system includes a loading platform having a gap separating a first portion of the loading platform from a second portion of the loading platform. A ride vehicle is coupled to a transport extending through the gap, where the transport is configured to propel the ride vehicle along a loading path adjacent to the loading platform. The gap blocking system also includes a guardrail assembly having a plurality of guardrail units coupled to the first portion of the loading platform and configured to transition between a first position and a second position, where the plurality of guardrail units are configured to block access to the gap when in the first position. The ride vehicle includes an engagement feature that is configured to interface with an individual guardrail unit of the plurality of guardrail units to selectively transition the individual guardrail unit from the first position to the second position. The individual guardrail unit is configured to permit the ride vehicle to occupy a guest-accessible position adjacent to or on the loading platform in the second position.

In an embodiment, a gap blocking system includes a loading platform having a gap separating a first portion of the loading platform from a second portion of the loading platform. A ride vehicle is coupled to a transport extending through the gap, where the transport is configured to propel the ride vehicle along a loading path of the loading platform. The gap blocking system includes a panel assembly coupled to the loading platform. The panel assembly includes a plurality of panels, where each panel of the plurality of panels is coupled to a respective actuator configured to selectively transition the panels between first positions and second positions. Each panel of the plurality of panels is configured to block access to a portion of the gap in the first position and each panel of the plurality of panels is configured to expose the portion of the gap in the second position to permit the ride vehicle to occupy a guest-accessible position on or adjacent to the loading platform. In the guest-accessible position, the ride vehicle extends across a radial dimension of the gap to block access to the portion of the gap.

In an embodiment, a method of operating a gap blocking system for an amusement park attraction includes transitioning, via a plurality of actuators, a plurality of panels of a loading platform to extended positions to cover a gap of the loading platform to block access to the gap. The method also includes detecting that a ride vehicle approaching the loading platform from a ride track is within a threshold distance of the gap. The method further includes transitioning, via at least one of the actuators, a corresponding panel of the plurality of panels to a retracted position to expose a portion of the gap to permit the ride vehicle to enter the gap and to occupy a guest-accessible position along the loading platform, where a chassis of the ride vehicle overlaps with a radial dimension of the gap in the guest-accessible position to block access to the portion of the gap.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
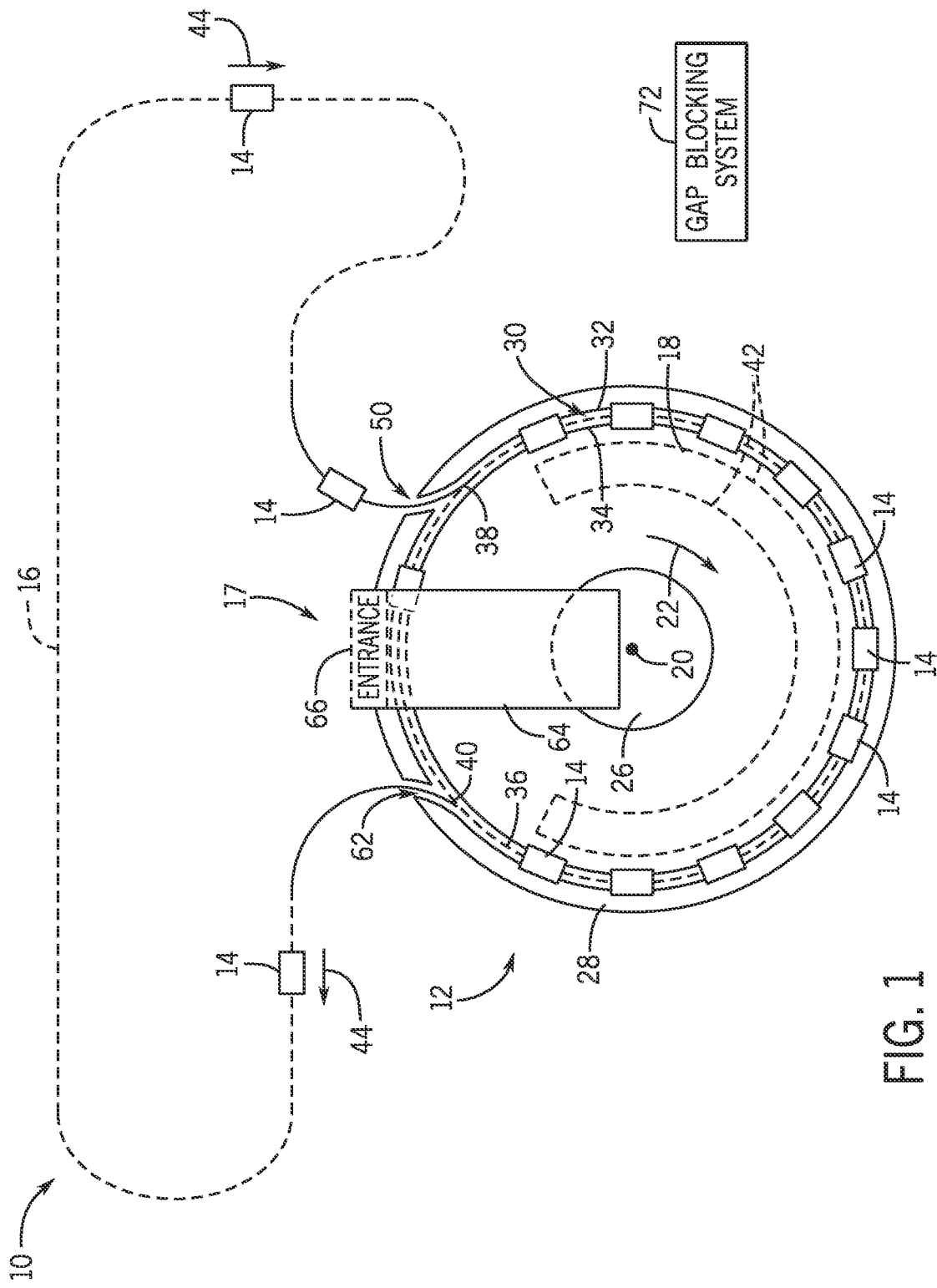
FIG. 1 is a schematic top view of an embodiment of a portion of a ride system, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Certain amusement park attractions may include loading systems that permit passengers to load into and/or to unload from ride vehicles of the attractions while the ride vehicles travel along the loading system. As the ride vehicles enter a loading area of the attraction, the ride vehicles may slow down but continue moving at a relatively low speed along a track or path while passengers exit the vehicles and as new passengers are loaded onto the vehicles. The system may include a loading platform configured as a turntable, or, as discussed below, as a linear platform, which is stationary or that is configured to rotate about an axis (e.g., a central vertical axis) about which the vehicles move. A stationary outer platform may be disposed about a portion of the turntable or substantially all of the turntable to form a gap between the turntable and the outer platform. The gap may define a loading path along which ride vehicles may travel during loading and/or unloading of passengers from the ride vehicles. In some embodiments, the ride vehicles may travel along the loading path at a speed that is substantially equal to a rotational speed of the turntable. That is, the rotational speed of the ride vehicles about the axis may substantially match the rotational speed of the turntable, such that relative movement between the ride vehicles and the turntable may be substantially unperceivable. As such, an edge of the turntable may be substantially stationary relative to an edge of a particular ride vehicle to permit passengers to board into or unload from the ride vehicle without having to walk along the ride vehicle to adjust to a speed of the ride vehicle during such loading/unloading procedures. In this manner, the loading system may facilitate loading and unloading of passengers into non-stationary ride vehicles. However, portions of the gap adjacent to or otherwise surrounding the ride vehicles may permit passengers to lose items (e.g., keys, coins, cellular phones) in the gap.

Therefore, embodiments of the present disclosure are directed to a gap blocking system that is configured to block access to the gap, while still permitting ride vehicles to move along or within the gap during operation of the loading system. For example, in some embodiments, the gap blocking system includes an actuatable guardrail assembly (e.g., a guarding assembly) that is disposed about a perimeter of the loading platform. The guardrail assembly includes a plurality of guardrail units that are each configured to selectively transition between an extended position, in which the guardrail units block guest access to the gap, and a retracted or subducted position, in which the guardrail units permit the ride vehicles to occupy a guest-accessible position along the turntable. In the guest-accessible position of the ride vehicles, respective chassis of the ride vehicles are configured to block guest access to the gap. Accordingly, the guardrail units may be configured to block guest access to any portions of the gap that are not already occupied by the ride vehicles and blocked from guest access via components of the ride vehicles (e.g., respective chassis of the ride vehicles). As discussed herein, in some embodiments, the guardrail units may be configured to transition between the respective extended and retracted positions in response to engagement (e.g., physical contact) with features of the ride vehicles. That is, in an embodiment, the ride vehicle directly contacts an individual guardrail unit to cause the guardrail unit to move from the extended position to the retracted position. Indeed, in some embodiments, the guardrail assembly may be a passively actuated system that is operable without involving use of dedicated actuators to adjust the guardrail units.

Embodiments of the present disclosure are also directed to a gap blocking system that includes an actuatable panel assembly. The panel assembly is configured to selectively block the gap between the platform (e.g., a loading turntable) and the outer platform to substantially eliminate or close a gap that may be present, while nonetheless permitting ride vehicles to travel along the gap during operation of the loading system. For example, the panel assembly includes a plurality of panels that may be coupled to the turntable and configured to rotate about the axis together with the turntable. The panels may be associated with respective actuators that are configured to selectively transition the panels from an extended position to a retracted position to unblock (e.g., uncover) portions of the gap along which ride vehicles are positioned and to block (e.g., cover) other portions of the gap that are not occupied by the ride vehicles. Accordingly, the panel system may permit ride vehicles to travel along the loading system to receive and/or unload passengers at any suitable location along the turntable, while guest access to the gap is substantially blocked by the actuatable panels. These and other features will be described below with reference to the drawings.

It is important to note that, while the present disclosure describes the embodiments of the gap blocking system (e.g., the actuatable guardrail assembly, the actuatable panel assembly) as configured for use in an amusement park setting, it should be appreciated that the disclosed embodiments of the gap blocking system may be implemented to selectively block access to various gaps that may be present in a variety of industrial settings. For example, embodiments of the gap blocking system discussed herein may be used to block access to gaps that may be present in various conveyor systems or other devices utilized for moving components along a path (e.g., a track).

Turning now to the figures, FIG. 1 is a schematic of an embodiment of a ride system 10 (e.g., an attraction) of an amusement park. The ride system 10 includes a loading system 12 that facilitates loading and/or unloading of passengers (e.g., guests of the amusement park) into ride vehicles 14 of the ride system 10. For example, passengers may load into the ride vehicles 14 at the loading system 12, may travel along an attraction path 16 of the ride system 10, and may arrive back at the loading system 12 to unload from the ride vehicles 14. While traveling along the attraction path 16, passengers may be exposed to a variety of experiences, such as virtual reality, alternate reality, environment interactions, multiple ride paths, water features, special effects, and so forth. It should be noted that portions of the ride system 10, such as the attraction path 16, have been intentionally simplified to focus on aspects of the loading system 12.

In the depicted embodiment, the loading system 12 includes loading platform 17 having a turntable 18 (e.g., a first portion of the loading platform 17) that is configured to rotate (e.g., at a substantially constant rotational speed) about an axis 20. However, it should be understood that the embodiments disclosed herein may also be used with a stationary loading platform that does not rotate. In the illustrated embodiment, the turntable 18 is substantially circular and rotates in a clockwise direction 22 about the axis 20. However, in other embodiments, the turntable 18 may be any suitable shape, which may correspond to a theme of the ride system 10, and may rotate in a counter-clockwise direction about the axis 20. Moreover, in certain embodiments, the turntable 18 may be replaced with a belt or other track system (e.g., a linear platform and associated track system) that is configured to travel along a linear path or along another predetermined path (e.g., a non-symmetric path). In some embodiments, the turntable 18 may include a stationary portion 26 disposed therein, which is not configured to rotate about the axis 20. That is, the turntable 18 may include a generally annular shape and may be disposed about the stationary portion 26, such that the turntable 18 may rotate about the axis 20 relative to the stationary portion 26.

As shown in the illustrated embodiment, the turntable 18 is at least partially circumscribed by an outer platform 28 (e.g., a second portion of the loading platform 17), which, in some embodiments, is configured to remain stationary relative to the axis 20. The outer platform 28 may be spaced apart from the turntable 18, such that a gap 30 is formed between an inner edge 32 of the outer platform 28 and an outer edge 34 of the turntable 18. The attraction path 16 may be coupled to a loading path 36 that extends along the gap 30 and about the axis 20. Particularly, the loading path 36 may extend along the gap 30 between a terminal end 38 and an initiating end 40 of the remaining attraction path 16. Accordingly, the loading path 36 may form a portion of the overall attraction path 16. As discussed in detail below, passengers may load into and/or unload from the ride vehicles 14 along the loading path 36. A portion of the turntable 18 that is positioned adjacent to the loading path 36 at a particular instance in time will be referred to herein as a loading zone 42 of the loading system 12 (e.g., the loading zone 42 may be indicative of a region of the turntable 18 outlined by the illustrated phantom lines).

The ride vehicles 14 may travel along the attraction path 16 in a direction of travel 44. The ride vehicles 14 may enter the loading path 36 via an entry avenue 50 (e.g., a path or passage) that may be formed within the outer platform 28. In some embodiments, the loading path 36 extends about the axis 20 of the turntable 18 (e.g., the loading path 36 has a radius extending from the axis 20). As such, the ride vehicles 14 may travel in conjunction with (i.e., together with or at the same speed as) the turntable 18 along a length of the loading path 36. For example, while traveling along the loading path 36, the ride vehicles 14 may travel at substantially the same speed about the axis 20 as the rotational speed of the turntable 18 about the axis 20. In this manner, a position and an orientation of each of the ride vehicles 14 along loading zone 42 of the turntable 18 may remain substantially constant. In other words, each ride vehicle 14 may maintain a temporarily fixed position relative to a circumference of the turntable 18 while traveling along the loading path 36 and while the turntable 18 rotates about the axis 20. In this manner, the loading system 12 may substantially maintain an orientation of the turntable 18 relative to the ride vehicles 14, which may include seats facing towards the outer edge 34, while the ride vehicles 14 travel along the loading path 36. Accordingly, passengers may board into the ride vehicles 14 from the loading zone 42 or may unload from the ride vehicles 14 onto the loading zone 42 without having to walk along a particular ride vehicle 14 to adjust to a speed of the ride vehicle 14 during such loading/unloading procedures. It should be understood that, in certain embodiments, respective speeds of the ride vehicles 14 along the loading path 36 may be less than an average speed of the ride vehicles 14 along a remaining portion of the attraction path 16. Upon completion of loading/unloading procedures, the ride vehicles 14 may exit the loading path 36 via an exit avenue 62 adjacent to the initiating end 40 of the attraction path 16.

As shown in the illustrated embodiment, an entrance ramp 64 may extend between an entrance 66 of the ride system 10 and the stationary portion 26 of the loading system 12. In some embodiments, the entrance ramp 64 may be any suitable angled path, which may include stairs, a substantially flat angled surface, an escalator, or any combination thereof. Accordingly, guests may enter (e.g., walk onto) the stationary portion 26 from the entrance 66 while certain ride vehicles 14 or other moving components of the loading system 12 travel about the axis 20 (e.g., beneath the entrance ramp 64). Generally, guests may, from the stationary portion 26, step onto the loading zone 42 of the turntable 18, and subsequently board into a particular one of the ride vehicles 14 traveling along the loading zone 42. It should be understood that, to exit the ride system 10, guests may dismount from the ride vehicles 14 onto the loading zone 42, walk toward the stationary portion 26, and may subsequently exit to the loading system 12 via the entrance ramp 64.

Figure 2:
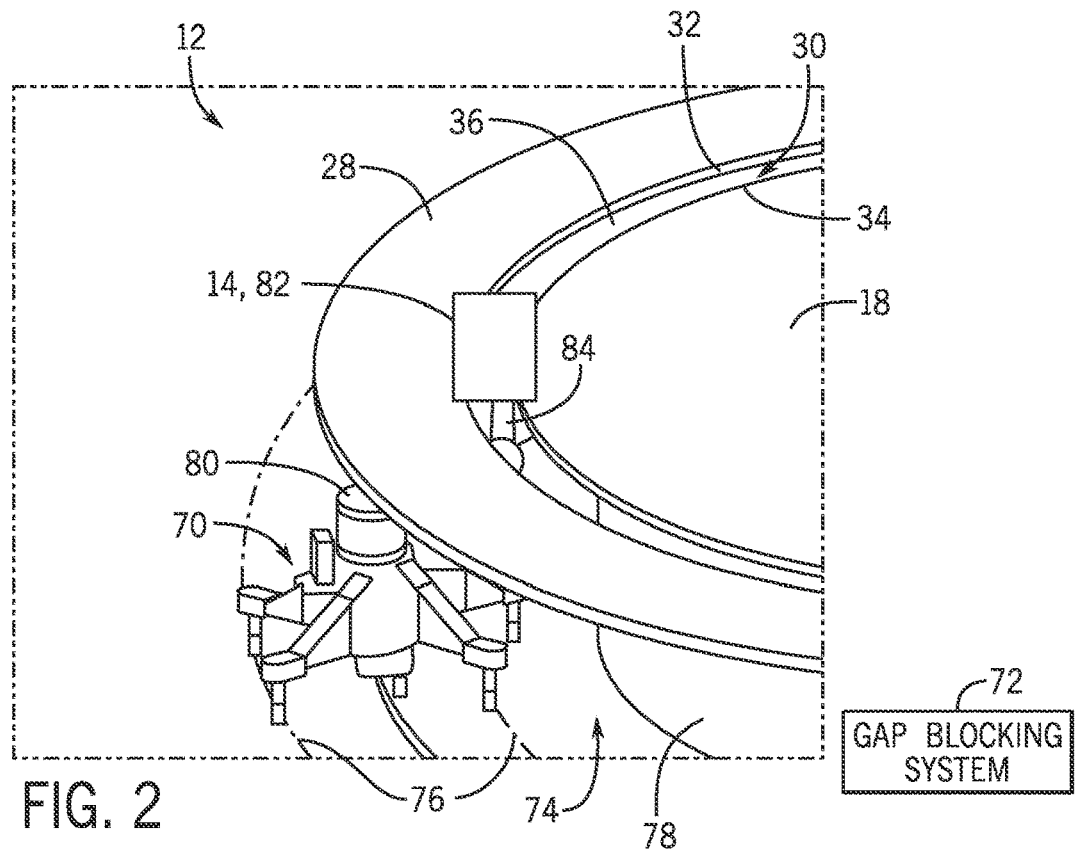
FIG. 2 is a perspective view of an embodiment of a ride system, in accordance with aspects of the present disclosure.

The ride vehicles 14 travel along the loading path in a track-based or trackless system. In an embodiment, each of the ride vehicles 14 traveling along the loading path 36 may be associated with a respective transport 70, as shown in FIG. 2, which is configured to propel the ride vehicles 14 along the loading path 36 and about the axis 20. In certain embodiments, the transport 70 may be disposed partially beneath the turntable 18 and/or the outer platform 28 and may be coupled to a particular ride vehicle 14 via a support structure extending through the gap 30. Indeed, the gap 30 may permit the transport 70 to couple to and propel a corresponding ride vehicle 14 along the loading path 36. Unfortunately, the gap 30 may permit guests loading and/or unloading from the ride vehicles 14 or otherwise walking adjacent to the loading path 36 to accidentally lose certain items (e.g., keys, coins, cellular phones) in the gap 30 by dropping the items into the gap 30. Accordingly, embodiments of the ride system 10 discussed herein are equipped with a gap blocking system 72 that is configured to substantially block guest access to the gap 30. More specifically, the gap blocking system 72 is configured to selectively block guest access to portions of the gap 30 that are not occupied by components of the ride vehicles 14 or otherwise covered by the ride vehicles 14 (e.g., covered by respective chassis of the ride vehicles 14). Accordingly, the gap blocking system 72 may permit the ride vehicles 14 to continuously move along the loading path 36 while substantially eliminating a likelihood of guests losing items in the gap 30.

To better illustrate the transport 70 and to facilitate the subsequent discussion of the gap blocking system 72 as used in conjunction with the transport 70, FIG. 2 is a perspective view of an embodiment of the loading system 12. As shown in the illustrated embodiment, the transport 70 is positioned in a space 74 beneath the turntable 18 and/or the outer platform 28 and is engaged with a guide track 76. The guide track 76 may extend about a frame 78 supporting the turntable 18 and permit the transport 70 to propel along the guide track 76 about the axis 20. In some embodiments, the guide track 76 and the loading path 36 may include the same path or track structure. A robotic manipulator 80 may couple the transport 70 to one of the ride vehicles 14, referred to hereinafter as a ride vehicle 82, to permit the transport 70 to move the ride vehicle 82 along the loading path 36. As shown in the illustrated embodiment, the robotic manipulator 80 may include a support structure 84 (e.g., a shaft) that extends through the gap 30 and engages with the ride vehicle 82. As such, the support structure 84 may facilitate coupling the ride vehicle 82 to the transport 70 positioned beneath the turntable 18 and/or the outer platform 28. For clarity, it should be understood that, as used herein, a "ride vehicle" may refer to any one or combination of components of the ride vehicle 82 (e.g., any one of the ride vehicles 14), the robotic manipulator 80, and/or the transport 70.

Figure 3:
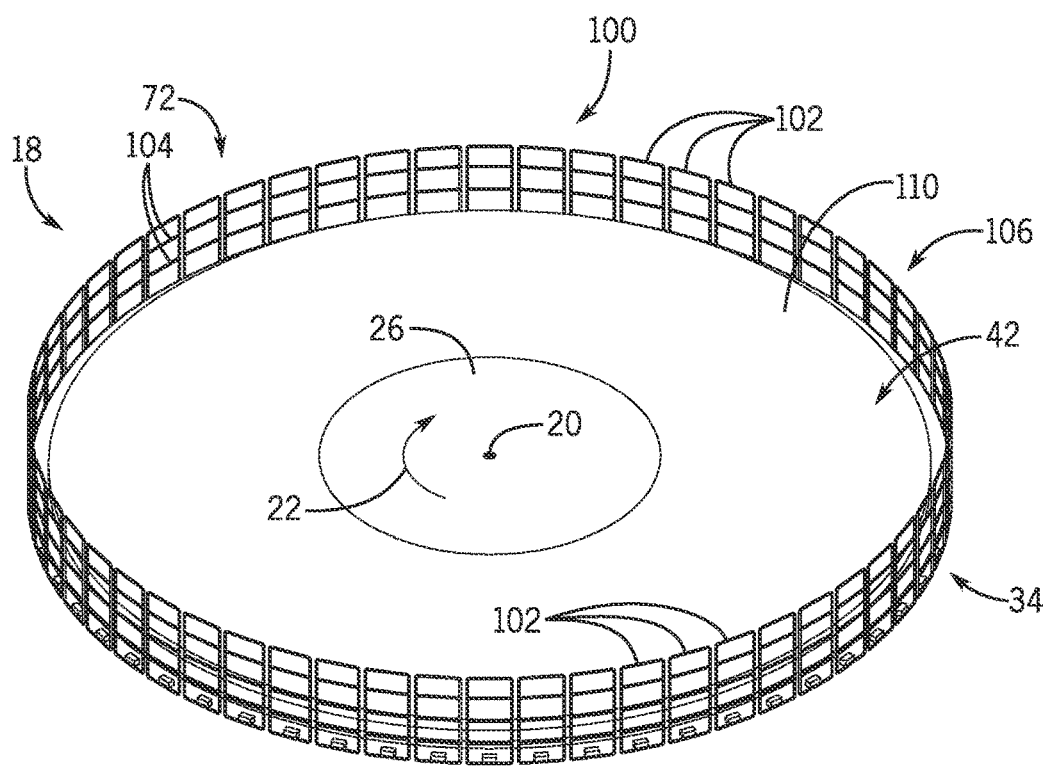
FIG. 3 is a perspective view of an embodiment of a portion of a turntable for a ride system having a guardrail assembly, in accordance with aspects of the present disclosure.

FIG. 3 is a perspective view of an embodiment of the turntable 18, illustrating an embodiment of the gap blocking system 72. For example, in some embodiments, the gap blocking system 72 includes a guardrail assembly 100 having a plurality of individual guardrail units 102. The guardrail units 102 are positioned about a circumference of the turntable 18 and are coupled to the turntable 18. To this end, each of the guardrail units 102 may rotate with the turntable 18 about the axis 20 (e.g., in the clockwise direction 22). As discussed below, the guardrail units 102 are configured to block (e.g., obstruct) guest access to the gap 30, while permitting ride vehicles 14 to travel along the loading path 36 during operation of the loading system 12. Each of the guardrail units 102 may be assembled from one or more rails 104 (e.g., tubing) made of aluminum, stainless steel, polymeric material, or other suitable materials.

Figure 5:
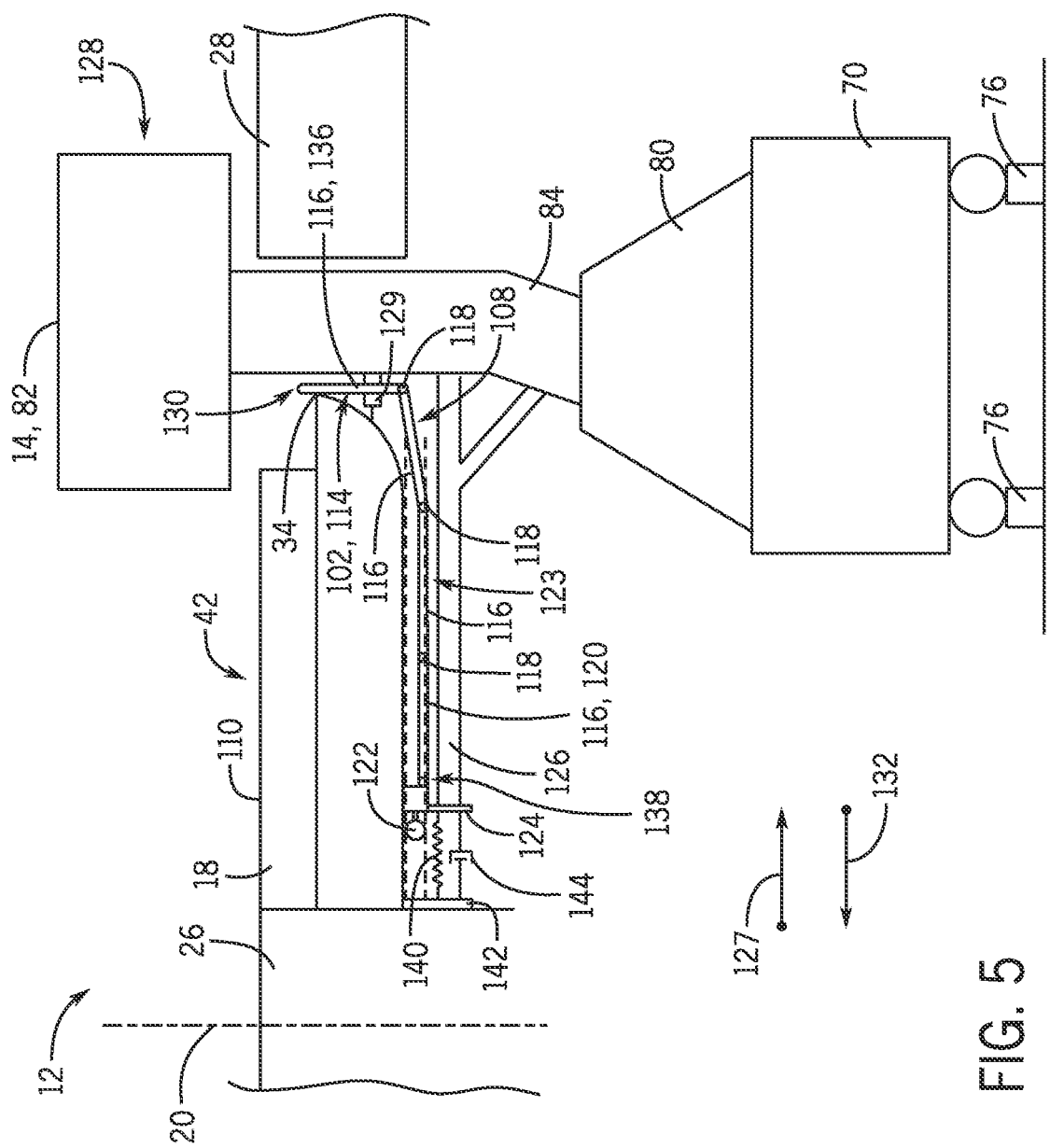
FIG. 5 is a cross-sectional side view of an embodiment of a turntable for a ride system having a guardrail assembly, in accordance with aspects of the present disclosure.

In an embodiment, each of the guardrail units 102 may be configured to selectively transition between a respective extended position 106 (e.g., a first position) and a respective retracted position 108 (e.g., a second position), as shown in FIG. 5. In the extended positions 106, the guardrail units 102 may be positioned proximate to the outer edge 34 of the turntable 18 and may be configured to extend generally vertically (e.g., along the axis 20) or orthogonally out of a plane relative to a surface 110 of the turntable 18. Accordingly, in the extended positions 106, the guardrail units 102 may block (e.g., obstruct) guest access to the gap 30 and confine the guests to the loading zone 42. That is, the guardrail units 102 may block guests from obtaining access to the gap 30 and, thus, reduce or substantially eliminate a likelihood of guests losing items (e.g., keys, coins, cellular phones) in the gap 30. As discussed in detail below, each of the guardrail units 102 may be configured to translate along a respective radial dimension of the turntable 18 to selectively retract (e.g., subduct) below the turntable 18 to transition to the retracted position 108. In the retracted positions 108, the guardrail units 102 permit the ride vehicles 14 to occupy guest-accessible positions along the loading zone 42 to permit guests to load into or unload from particular ride vehicles 14. It should be understood that, when the ride vehicles 14 are in the guest-accessible positions along the loading zone 42, respective chassis or other components of the ride vehicles 14 may block guest access to the gap 30. As such, the guardrail assembly 100 may be configured to, in particular, block guest access to portions of the gap 30 that are not blocked or otherwise obstructed by the ride vehicles 14 themselves. The guardrail units 102 may be configured to actuate independently of one another such that the retraction of an individual guardrail unit 102 does not cause actuation of adjacent guardrail units 102.

Figure 4:
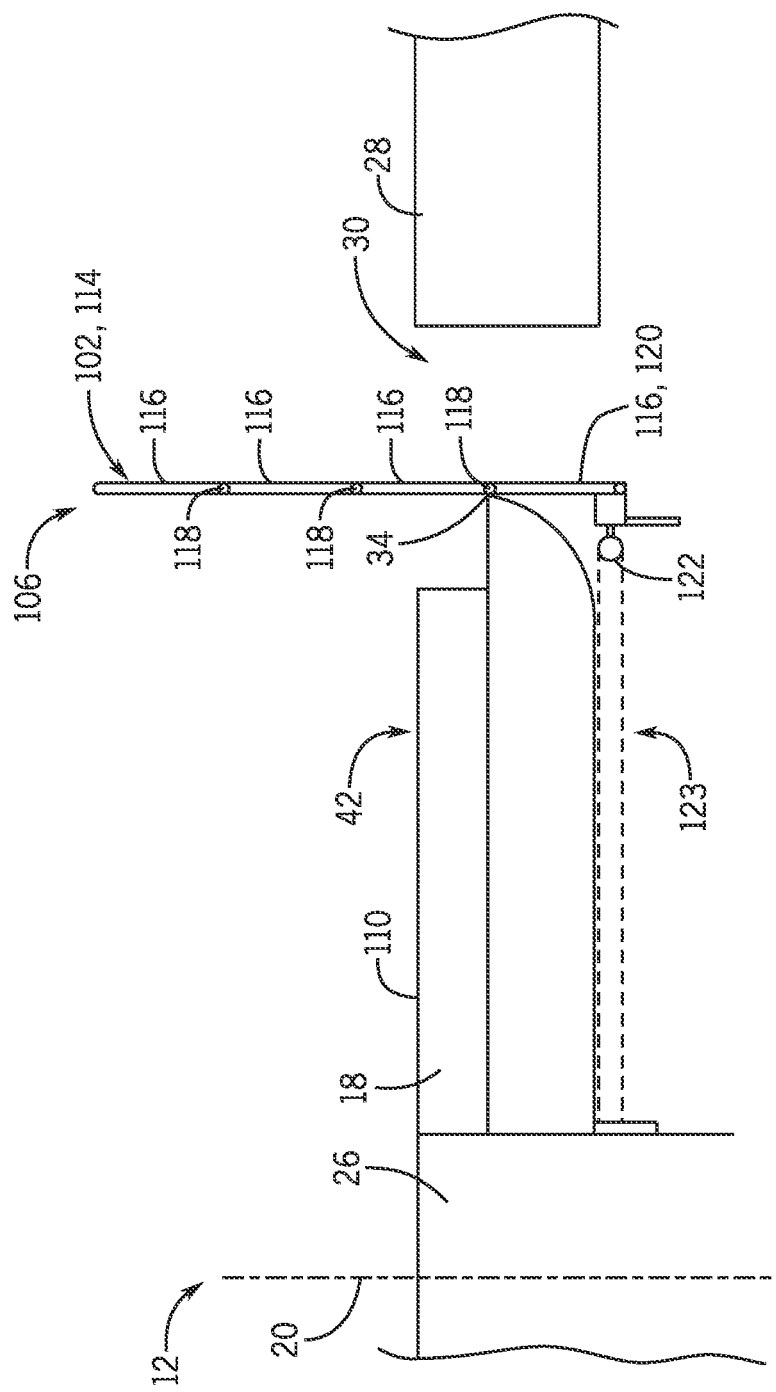
FIG. 4 is a cross-sectional side view of an embodiment of a portion of a turntable for a ride system having a guardrail assembly, in accordance with aspects of the present disclosure.

FIG. 4 is a cross-sectional side view of an embodiment of a portion of the loading system 12, illustrating one of the guardrail units 102, referred to hereinafter as a guardrail unit 114. In the illustrated embodiment, the guardrail unit 114 is in the extended position 106, such that the guardrail unit 114 is positioned substantially adjacent to the outer edge 34 and extends generally vertically (e.g., along an axis parallel to the axis 20) to block guest access to the gap 30. However, it should be understood that the guardrail unit 114 may also extend at an angle to form an acute or obtuse angle with the surface 110. In some embodiments, the guardrail unit 114 may include a plurality of rail sections 116 that are hingedly (e.g., pivotably) coupled to one another at respective hinge points 118. As discussed below, the rail sections 116 permit the guardrail unit 114 to articulate between various intermediate positions to facilitate subduction of the guardrail unit 114 beneath the turntable 18.

In some embodiments, a lower rail section 120 (e.g., a lower-most of the rail sections 116) includes a roller assembly 122 that is configured to engage with a track assembly 123 of the turntable 18. The track assembly 123 may be disposed beneath the turntable 18 (e.g., coupled to an underside of the turntable 18) and may be configured to rotate with the turntable 18 about the axis 20. The track assembly 123 engages with the roller assembly 122 to maintain a circumferential position of the guardrail unit 114 with respect to the turntable 18, while permitting the guardrail unit 114 to translate radially along the turntable 18 (e.g., with respect to the axis 20). As discussed below, to this end, the track assembly 123 may permit the guardrail unit 114 to selectively transition between the extended and retracted positions 106, 108. It should be appreciated that the roller assembly 122 may include one or more bearings, bushings, wheels or casters, polymeric pads, or any other suitable devices or assemblies that permit the roller assembly 122 to engage with and translate along the track assembly 123.

FIG. 5 is a cross-sectional side view of an embodiment of a portion of the loading system 12, illustrating the guardrail unit 114 in the retracted position 108. In some embodiments, the lower rail section 120, or another suitable portion of the guardrail unit 114, may include a push plate 124 coupled thereto. The push plate 124 is configured to engage with an engagement feature 126 of a particular ride vehicle 14, such as the ride vehicle 82, when the ride vehicle 82 enters the loading path 36. The engagement feature 126 may include one or more shafts or beams, an elongated plate, and/or other suitable protrusion or a plurality of protrusions that extend outwardly from the ride vehicle 82.

When the ride vehicle 82 approaches the turntable 18 from the entry avenue 50, the engagement feature 126 may engage (e.g., physically contact) the push plate 124 to force the push plate 124 in a radially inward direction 127. The engagement feature 126 may be coupled to a chassis 128 of the ride vehicle 82, to a portion of the robotic manipulator 80 (e.g., to the support structure 84), to the transport 70, or a combination thereof. In any case, engagement between the push plate 124 and the engagement feature 126 may induce articulation of the hinge points 118 to permit each of the rail sections 116 to sequentially subduct below the turntable 18. As such, the guardrail unit 114 may gradually transition from the extended position 106 to the retracted position 108 as the ride vehicle 82 approaches the turntable 18 (e.g., as the ride vehicle enters the loading path 36).

For example, in some embodiments, each of the hinge points 118 may include a biased hinge (e.g., a hinge assembly having an integral spring) that is biased to rest in a substantially linear configuration. That is, the biased hinges may be biased (e.g., via the integral springs) to align each of the rail sections 116 generally parallel to one another when the guardrail unit 114 is in the extended position 106. Accordingly, the biased hinges may be configured to maintain the rail sections 116 in a substantially vertical orientation (e.g., with respect to the surface 110 of the turntable 18) when the guardrail unit 114 is in the extended position 106. The biased hinges may articulate when the guardrail unit 114 is forced from the extended position 106 to the retracted position 108 (e.g., via the engagement feature 126) to permit the rail sections 116 to sequentially subduct beneath the turntable 18. For example, when translating along the track assembly 123 in the radially inward direction 127, the hinge points 118 may sequentially slide along the outer edge 34 of the turntable 18, thereby inducing articulation of the biased hinges, and thus, of the individual rail sections 116. By permitting such articulation of the rail sections 116, the biased hinges may ensure that the guardrail unit 114 does not interfere (e.g., contact) components of the ride vehicle 82 when transitioning from the extended position 106 to the retracted position 108, or vice versa. In some embodiments, a suitable support structure 129 (e.g., a guide ring) may be positioned about the guardrail unit 114 near the turntable 18 and ensure that a distal end portion 130 of the guardrail unit 114 does not travel along an arc that swings in a radially outward direction 132 as the individual rail sections 116 sequentially subduct beneath the turntable 18. In this manner, cooperation between the engagement feature 126, the track assembly 123, the hinge points 118, and the support structure 129 may permit the guardrail unit 114 to gradually subduct beneath the turntable 18 as ride vehicle 82 approaches the turntable 18. It should be appreciated that, in certain embodiments, the guardrail assembly 100 may be configured to retract into a slot or cavity formed within the turntable 18 when transitioning to the retracted position 108, instead of subducting below the turntable 18 (e.g., instead of subducting below an underside of the turntable 18). In any case, in the retracted position 108, the guardrail unit 114 may be out of a line of sight or otherwise inaccessible to guests positioned in the loading zone 42, and may permit the ride vehicle 82 to occupy a guest accessible position along the loading path 36.

In certain embodiments, the rail sections 116 may be configured to selectively engage (e.g., couple) and disengage (e.g., decouple) from one another at the hinge points 118 to permit articulation of the rail sections 116 during transitioning of the guardrail unit 114 between the extended and retracted positions 106, 108. For example, in some embodiments, certain of the rail sections 116 may include a first end portion having a male coupler and a second end portion having a female coupler. The male coupler of a particular rail section 116 may be configured to selectively engage (e.g., at one of the hinge points 118) with a respective female coupler of an adjacent rail section 116. An elastic wire, a spring mechanism, and/or another suitable device or mechanism may be configured to extend through an interior of each of the rail sections 116 and may be coupled to, for example, the distal end portion 130 of an upper most rail section 136 (e.g., an upper-most of the rail sections 116) and a lower end portion 138 of the lower most rail section 120. Accordingly, the elastic wire may apply and maintain a compressive force between each of the rail sections 116, which may be suitable to maintain engagement between the male and female couplers of the rail sections 116 when the guardrail unit 114 is in the extended position 106.

Indeed, when the guardrail unit 114 is in the extended position 106, engagement between the respective male and female couplers of the rail sections 116 may permit the rail sections 116 to extend substantially vertically from the turntable 18. The elastic wire extending through the rail sections 116 may ensure that the respective male and female couplers do not disengage from one another (e.g., due to tampering by guests) while the guardrail unit 114 is in the extended position 106. When the guardrail unit 114 is subducted beneath the turntable 18, the rail sections 116 may sequentially disengage from one another at the hinge points 118 (e.g., due to contact with the outer edge 34 of the turntable 18) to permit the guardrail unit 114 to subduct below the turntable 18. Particularly, the engagement feature 126 may apply a force to guardrail unit 114 that is sufficient to elongate the elastic wire within the rail sections 116 to permit respective male and female couplers of the rail sections 116 to sequentially disengage with one another during subduction of the guardrail unit 114. Accordingly, such sequential decoupling of the rail sections 116 permits articulation between the respective rail sections 116. The elastic wire may be configured to sequentially re-engage respective male and female couplers of the rail sections 116 when the guardrail unit 114 transitions from the retracted position 108 to the extended position 106.

In some embodiments, a spring 140 may be positioned between a support 142 (e.g., a component of the turntable 18) and the push plate 124 to bias (e.g., force apart) the support 142 from the push plate 124. Accordingly, when the ride vehicle 82 exits the loading path 36 (e.g., via the exit avenue 62), the spring 140 may force the guardrail unit 114 in the radially outward direction 132 along the track assembly 123. That is, the spring 140 may force the guardrail unit 114 toward the extended position 106 as the engagement feature 126 travels outwardly from the turntable 18. It should be understood that a spring force of the spring 140 may be selected such that, when the guardrail unit 114 is in the extended position 106, guests are unable to force the guardrail unit 114 downwardly toward the retracted position 108. Moreover, in other embodiments, a hydraulic pushrod, or another suitable actuator (e.g., a pneumatic actuator, a linear actuator) may be used in addition to, or in lieu of, the spring 140 to transition the guardrail unit 114 from the retracted position 108 to the extended position 106.

In some embodiments, a dampener 144 may be coupled to the support 142 in addition to the spring 140. The dampener 144 may be configured to limit an extension rate of the guardrail unit 114 (e.g., a rate by which the guardrail unit 114 translates from the retracted position 108 to the extended position 106). Particularly, the dampener 144 may control a rate by which the guardrail unit 114 translates from the retracted position 108 to the extended position 106 when the engagement feature 126 translates in the radially outward direction 132 (e.g., when the ride vehicle 82 exits the loading path 36 via the exit avenue 62), such that the push plate 124 may translate in the radially outward direction 132 at a rate that is slower than a translation rate of the engagement feature 126 in the radially outward direction 132. In some embodiments, sensors (e.g., proximity sensors) may be positioned near the push plate 124 and configured to monitor a position of the push plate 124, and thus, a position of the guardrail unit 114. In some embodiments, such sensors may facilitate generating an alarm if, for example, the ride vehicle 82 exits the loading path 36 and the guardrail unit 114 is not detected as transitioning from the retracted position 108 to the extended position 106.

Figure 6:
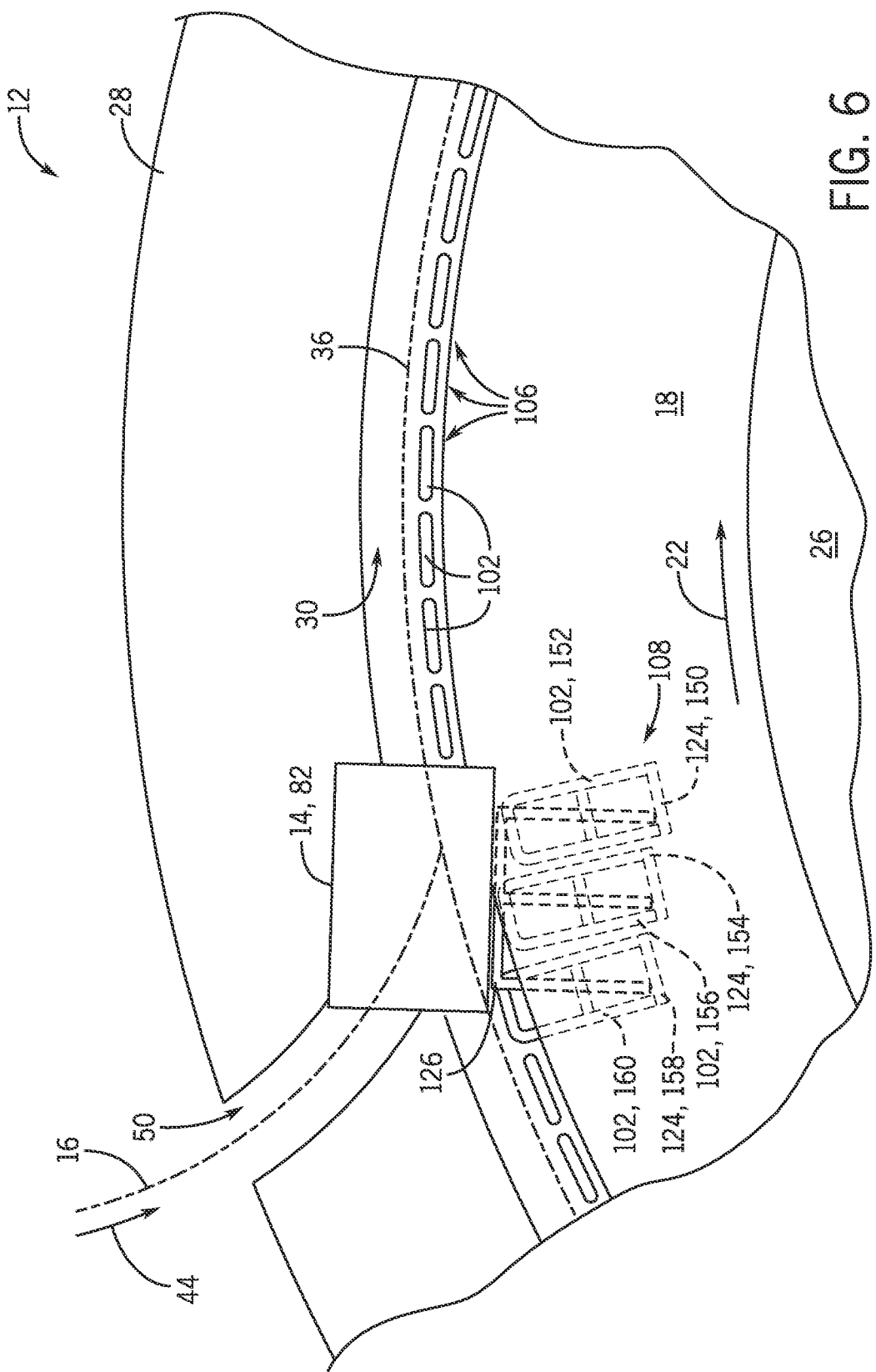
FIG. 6 is a schematic top view of an embodiment of a portion of a loading system for a ride system having a guardrail assembly, in accordance with aspects of the present disclosure.
Figure 7:
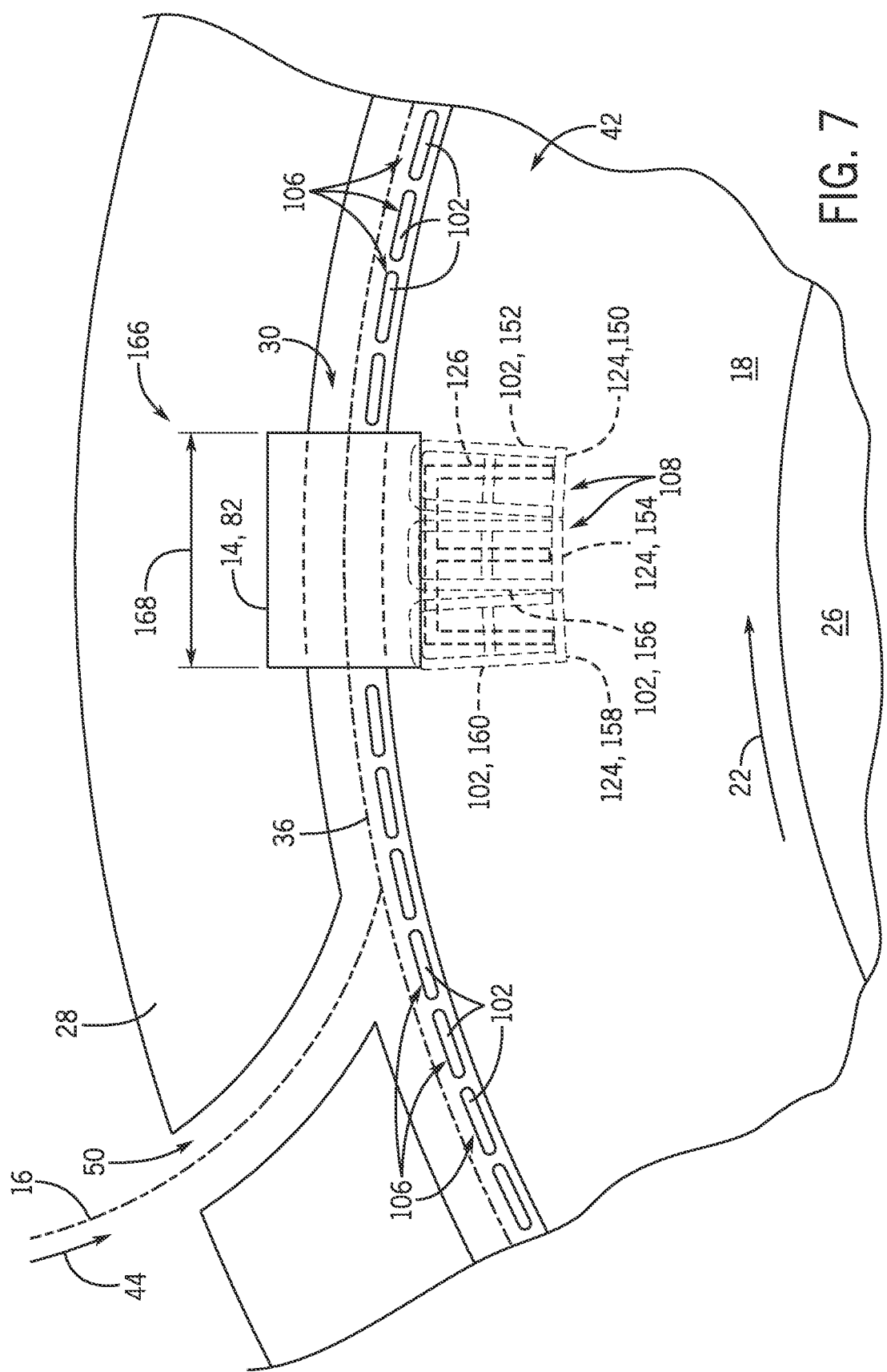
FIG. 7 is a schematic top view of an embodiment of a portion of a loading system for a ride system having a guardrail assembly, in accordance with aspects of the present disclosure.

It should be understood that, in some embodiments, the ride vehicle 82 may be configured to engage with respective push plates 124 of two or more guardrail units 102 when the ride vehicle 82 enters the loading path 36. In such embodiments, the ride vehicle 82 may induce subduction of several of the guardrail units 102 in a sequential or staggered manner, in accordance with the techniques discussed above. For example, to better illustrate, FIG. 6 is a top schematic view of a portion of the loading system 12 that illustrates the sequential engagement of the engagement feature 126 with a first push plate 150 of a first guardrail unit 152, a second push plate 154 of a second guardrail unit 156, and a third push plate 158 of a third guardrail unit 160, as the ride vehicle 82 enters the loading path 36. Accordingly, the first, second, and third guardrail units 152, 156, 160 may sequentially subduct below the turntable 18 to transition from respective extended positions 106 to respective retracted positions 108. As shown in the illustrated embodiment of FIG. 7, the first, second, and third guardrail units 152, 156, 160 may rotate with the ride vehicle 82 about the axis 20 (e.g., while in the retracted positions 108) to permit guests to board or unload from the ride vehicle 82 along the loading zone 42. It should be understood that the first, second, and third guardrail units 152, 156, 160 may sequentially extend from beneath the turntable 18 to transition to their respective extended positions 106 as the ride vehicle 82 exits the loading path 36 via the exit avenue 62 (e.g., as the engagement feature 126 sequentially disengages from the first, second, and third push plates 150, 154, 158).

Figure 8:
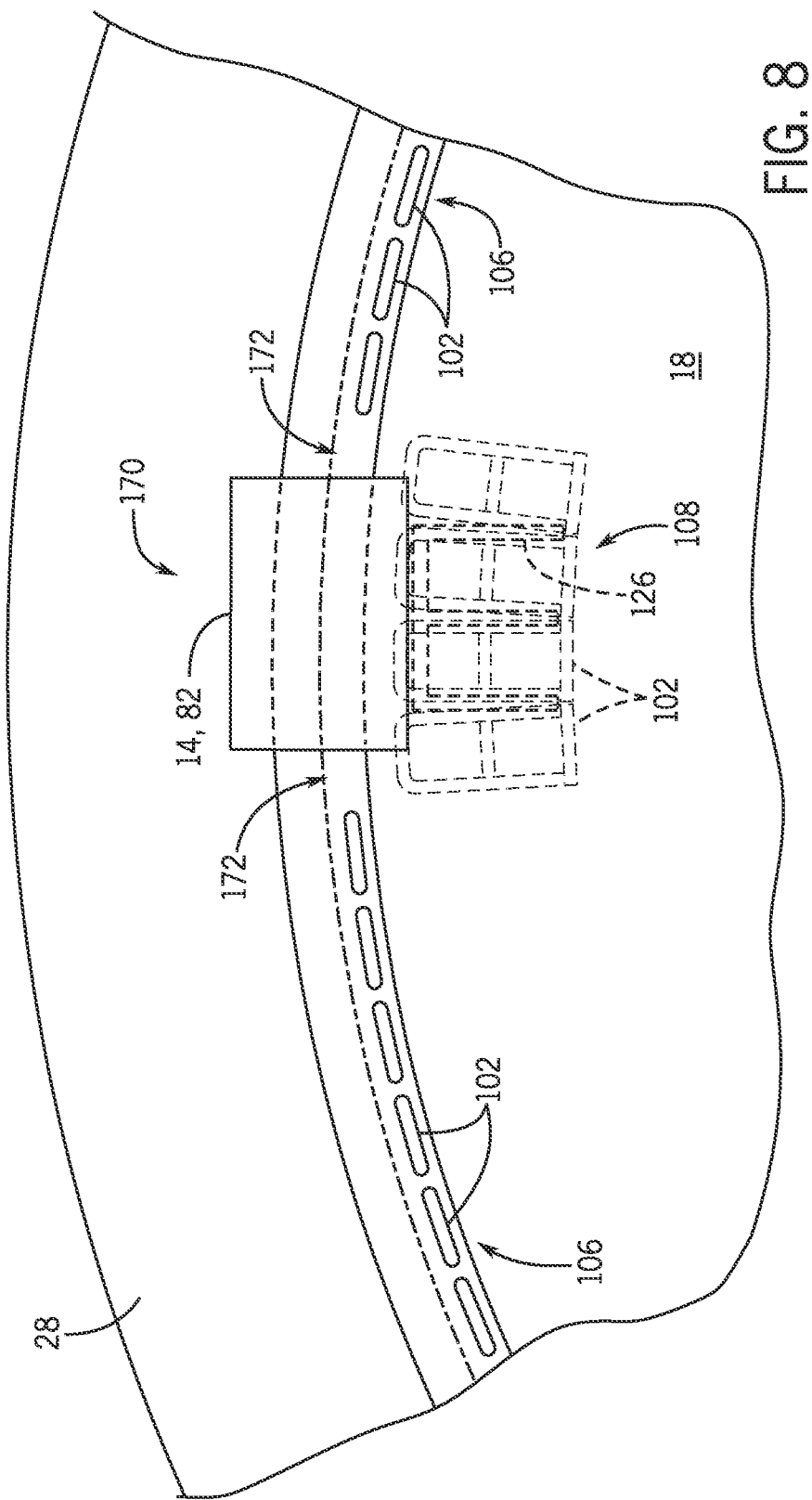
FIG. 8 is a schematic top view of an embodiment of a portion of a loading system for a ride system having a guardrail assembly, in accordance with aspects of the present disclosure.

In some embodiments, the guardrail units 102 may be sized such that, when the ride vehicle 82 is in an aligned position 166 along the loading path 36 (e.g., with respect to the turntable 18), particular guardrail units 102 (e.g., the guardrail units 152, 156, 160) positioned along a length 168 of the ride vehicle 82 are transitioned to respective retracted positions 108. Accordingly, substantially all of the length 168 of the ride vehicle 82 may be accessible to guests along the loading zone 42, while portions of the gap 30 positioned forward and aft of the ride vehicle 82 are blocked by respective guardrail units 102 in the extended positions 106. It should be appreciated that the guardrail units 102 may be dimensioned such that, even when the ride vehicle 82 is in a misaligned position 170, as shown in FIG. 8, with respect to the turntable 18, spaces 172 (e.g., as shown in FIG. 8) between the ride vehicle 82 and adjacent guardrail units 102 that are in the extended positions 106 may be insufficient to permit guest access to the gap 30.

Figure 9:
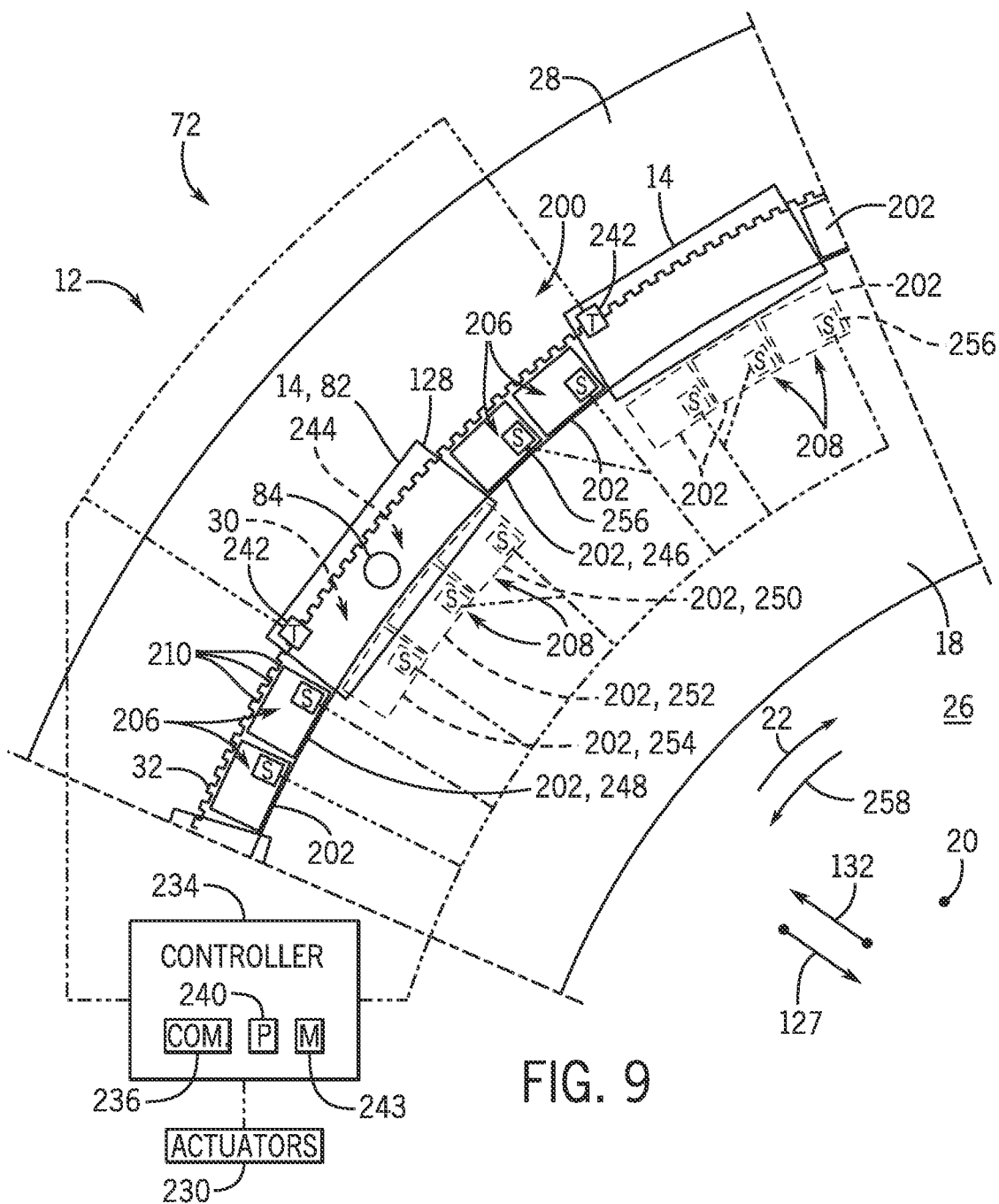
FIG. 9 is a schematic top view of an embodiment of a portion of a loading system for a ride system having an actuated panel assembly, in accordance with aspects of the present disclosure.

While certain disclosed embodiments are discussed in the context of a plurality of guardrail units 102, the disclosed gap blocking system 72 may additionally or alternatively include an actuated panel system as generally provided herein. FIG. 9 is a schematic top view of an embodiment of a portion of the loading system 12, illustrating another embodiment of the gap blocking system 72 that includes an actuated panel system 200. As discussed below, the actuated panel system 200 includes a plurality of panels 202 that are configured to selectively block portions of the gap 30 that are not occupied by components of the ride vehicles 14 or otherwise covered by the ride vehicles 14 (e.g., covered by respective chassis of the ride vehicles 14). As such, the actuated panel system 200 may ensure that the gap 30 remains covered to guests via the ride vehicle 82 or the panels 202 during operation of the loading system 12.

In some embodiments, the panels 202 may be coupled to the turntable 18 and spaced about a circumference of the turntable 18. Accordingly, the panels 202 may rotate together with the turntable 18 about the axis 20. Each of the panels 202 may be configured to transition between an extended position 206 (e.g., a first position), in which the panels 202 extend across the gap 30 to cover or substantially cover a respective portion of the gap 30, and a retracted position 208 (e.g., a second position), in which the panels 202 uncover (e.g., expose) a respective portion of the gap 30. In some embodiments, the panels 202 may be configured to translate radially (e.g., with respect to the axis 20) relative to the turntable 18 between the extended and retracted positions 206, 208. For example, to transition to the extended positions 206, the panels 202 may translate in the radially outward direction 132 toward the outer platform 28. To transition to the retracted positions 208, the panels 202 may translate in the radially inward direction 127 to subduct beneath the turntable 18 and/or to enter a cavity within the turntable 18. As discussed below, each of the panels 202 may be associated with a suitable actuator that is configured to transition the panels 202 between the extended positions 206 and the retracted positions 208 based on one or more parameters of the loading system 12.

In some embodiments, radially outermost edges of the panels 202 may be configured to extend beneath the outer platform 28 or to extend into a groove formed within the outer platform 28 when the panels 202 are in the extended positions 206. Accordingly, the panels 202 may span fully across a radial dimension of the gap 30 when in the extended positions 206. In some embodiments, each of the panels 202 may include a particular geometric shape that facilitates covering the gap 30 and/or engaging within the outer platform 28 when the panels 202 are in the extended positions 206. For example, the panels 202 may include generally trapezoidal shapes or generally arch-like shapes that permit the panels 202 to abut and/or overlap with one another in the extended positions 206 to substantially cover the gap 30 (e.g., to mitigate or substantially eliminate a space between neighboring panels 202).

In some embodiments, the actuated panel system 200 may include a plurality of brushes 210 that are coupled to a wall or other structure disposed along the inner edge 32 of the outer platform 28 and that extend radially toward the axis 20 of the turntable 18. The brushes 210 may be configured to engage (e.g., overlap, physically contact) with the panels 202 when the panels 202 are in the extended positions 206. In this manner, the brushes 210 may ensure that any space that may remain between the inner edge 32 of the outer platform 28 and the radially outermost edges of the extended panels 202 is substantially covered. Further, the brushes 210 are able to be deflected when the panels 202 move, permitting movement of the panels 202 relative to the brushes 210. In an embodiment, the brushes 210 may span across a portion of the gap 30 to enable an overall length (e.g., a radial dimension, with respect to the axis 20) of the panels 202 to be reduced. That is, in the extended positions 206, the panels 202 may be configured to extend to the brushes 210, instead of to the inner edge 32 of the outer platform 28. In some embodiments, such a configuration of the brushes 210 may therefore reduce an actuation time that may be involved to transition the panels 202 between the extended positions 206 and the retracted positions 208. In certain embodiments, additional brushes may be coupled to the radially outermost edges of the panels 202 in addition to, or in lieu of, the brushes 210 coupled to the inner edge 32 of the outer platform 28.

Figure 10:
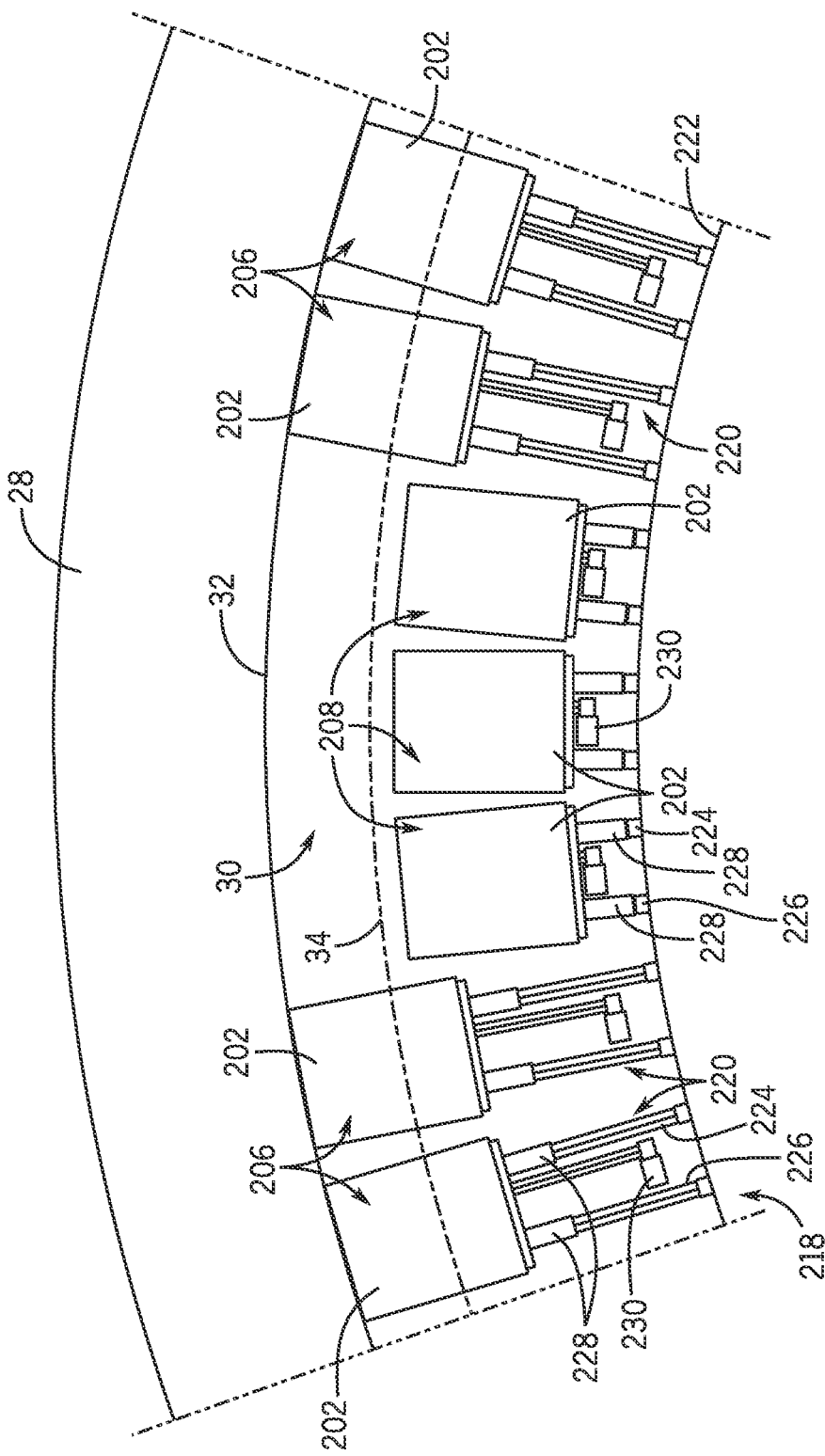
FIG. 10 is top view of an embodiment of a panel array of an actuated panel assembly for a ride system, in accordance with aspects of the present disclosure.

FIG. 10 is a top view of an embodiment of a portion of the loading system 12, illustrating some of the panels 202, referred to hereinafter as a panel array 218, of the actuated panel system 200. To better illustrate the panel array 218, the turntable 18 has been removed from the illustrated embodiment of the loading system 12. In some embodiments, each of the panels 202 includes a respective frame 220 that is configured to couple the panel 202 a suitable support structure 222 of the turntable 18 (e.g., a structure below the surface 110 of the turntable 18). For example, in the illustrated embodiment, each frame 220 includes a first frame rail 224 and a second frame rail 226 that are coupled to the support structure 222 and that extend generally radially from the axis 20. Each panel 202 includes a pair of guides 228 that are configured to engage with corresponding first and second frame rails 224, 226 to permit translational movement of the panels 202 with respect to the turntable 18. Particularly, respective actuators 230 associated with each of the panels 202 may be configured to selectively translate the panels 202 along the first and second frame rails 224, 226 between the extended positions 206 and the retracted positions 208. As an example, the actuators 230 may include electric actuators (e.g., linear actuators), hydraulic actuators, pneumatic actuators, mechanical actuators (e.g., threaded shafts), or any other suitable actuators that permit individual adjustability of the panels 202. However, in other embodiments, a single actuator may be used to adjust a position of two or more of the panels 202.

Although the panels 202 have been described as translating radially relative to the turntable 18, it should be appreciated that, in other embodiments, the panels 202 may move along any suitable path or motion profile to transition between the extended and retracted positions 206, 208. Indeed, it should be understood that the actuators 230 may transition the panels 202 between the extended positions 206 and the retracted positions 208 in any suitable manner. That is, instead of translating the panels 202 radially (e.g., with respect the axis 20) between the extended and retracted positions 206, 208, the actuators 230 may be configured to pivot, tilt, rotate, or otherwise move the panels 202 between the extended positions 206 and suitable retracted positions 208 (e.g., positions vertically beneath a surface of the turntable 18). For example, in some embodiments, the actuators 230 may be configured to pivot the panels 202 about respective lateral axes (e.g., axes that extend along a plane of the turntable 18) between the extended positions 206 and corresponding retracted positions 208. Moreover, as discussed below, the actuators 230 may be configured to translate some of the panels 202 or all of the panels 202 circumferentially about the axis 20 to transition between respective extended and retracted positions 206, 208. It should be appreciated that, in some embodiments, one or more of the panels 202 and their corresponding actuators 230 may be coupled to the outer platform 28 instead of to the turntable 18.

The following discussion continues with reference to FIG. 9. As shown in the illustrated embodiment, the loading system 12 may include a controller 234 that, as discussed below, may be configured to selectively transition certain of the panels 202 between the extended and retracted positions 206, 208 based on one or more parameters of the ride system 10. Indeed, the controller 234 may be operatively coupled to the actuators 230 via electrical lines and/or other suitable wired or wireless communication lines and configured to selectively actuate each of the actuators 230. The controller 234 may include communication circuitry 236, a processor 240, and a memory 243. The processor 240 may include a microprocessor, which may execute software for controlling the components of the loading system 12, such as the actuators 230, a drive motor of the turntable 18, the transports 70, and/or any other suitable components of the loading system 12 and/or the ride system 10. It should be appreciated that, in some embodiments, the controller 234 may be integrated with or include a portion of a central ride controller of the ride system 10.

The processor 240 may include multiple microprocessors, one or more "general-purpose" microprocessors, one or more special-purpose microprocessors, and/or one or more application specific integrated circuits (ASIC), or some combination thereof. For example, the processor 240 may include one or more reduced instruction set (RISC) processors. The memory 243 may include a volatile memory, such as random access memory (RAM), and/or a nonvolatile memory, such as read-only memory (ROM). The memory 243 may store information, such as control software, look up tables, configuration data, etc. For example, the memory 243 may store processor-executable instructions including firmware or software for the processor 240 execute, such as the actuators 230, a drive motor of the turntable 18, the transports 70, and/or any other suitable components of the loading system 12 and/or of the ride system 10. In some embodiments, the memory 243 is a tangible, non-transitory, machine-readable-medium that may store machine-readable instructions for the processor 240 to execute. The memory 243 may include ROM, flash memory, a hard drive, or any other suitable optical, magnetic, or solid-state storage medium, or a combination thereof.

In some embodiments, the controller 234 may be configured to determine the locations of the ride vehicles 14 along the attraction path 16 and/or the loading path 36 based on sensor data acquired from various sensors of the ride system 10. As an example, such sensors may include respective tracking sensors 242 (e.g., global positioning system [GPS] sensors) coupled to each of the ride vehicles 14 and in communication with the controller 234. However, it should be appreciated that, a variety of other sensors may be used in addition to, or in lieu of, the tracking sensors 242, to monitor respective positions of the ride vehicles 14 along the attraction path 16 or the loading path 36. The controller 234 may be configured to maintain the panels 202 in the extended positions 206 along portions of the turntable 18 that are not positioned adjacent any one of the ride vehicles 14. Accordingly, sections of the gap 30 along such portions of the turntable 18 may remain covered (e.g. inaccessible to guests) during operation of the loading system 12.

Upon determining that one of the ride vehicles 14, such as the ride vehicle 82, approaches the loading path 36 (e.g., approaches the gap 30 from the entry avenue 50), the controller 234 may instruct one or more of the panels 202 to transition to their respective retracted positions 208, thereby permitting the support structure 84 of robotic manipulator 80 to enter into and travel along the gap 30 during loading/unloading procedures of the ride vehicle 82. That is, the support structure 84 may be positioned in a space 244 (e.g., a portion of the gap 30) that is formed between a forward neighboring panel 246 and an aft neighboring panel 248 that are in the respective extended positions 206, such that the support structure 84 does not interfere with these panels 202 as the ride vehicle 82 and the panels 202, collectively, rotate about the axis 20. As an example, in some embodiments, the controller 234 may instruct (e.g., via control signals sent to the corresponding actuators 230) three panels 202 adjacent to the ride vehicle 82 to transition to the retracted positions 208 upon entry of the ride vehicle 82 into the loading path 36. Particularly, in certain embodiments, the controller 234 may initiate sequential or staggered retraction of a first panel 250, a second panel 252, and a third panel 254 of the three panels 202 as the ride vehicle 82 enters the loading path 36. The chassis 128 of the ride vehicle 82 may include exterior dimensions that are sufficient to cover a portion of the gap 30 (e.g., the space 244) that is exposed by the three panels 202 in the retracted positions 208. That is, in some embodiments, the chassis 128 may be configured to overlap with a radial dimension of the gap 30 when the ride vehicle 82 is in the loading path 36, thereby permitting the ride vehicle 82 to block guest access to the space 244. Accordingly, the gap 30 may remain substantially inaccessible to guests as the ride vehicle 82, the panels 202, and the turntable 18 rotate about the axis 20.

In certain embodiments, by retracting multiple panels (e.g., the first, second, and third panels 250, 252, 254) positioned beneath the ride vehicle 82, the controller 234 may create a buffer zone that is positioned between the support structure 84 of the robotic manipulator 80 and respective panels 202 (e.g., the forward and aft neighboring panels 246, 248) positioned before and aft of the support structure 84. The buffer zones may ensure that minor variations between a rotational speed of the turntable 18 and a traveling speed of the transport 70 along the gap 30 do not cause interaction (e.g., physical contact) between the support structure 84 and the forward and aft neighboring panels 246, 248. Moreover, as discussed below, the buffer zones may ensure that relative movement of the ride vehicle 82 relative to the turntable 18, which may occur when operation of the ride system 10 is unexpectedly suspended, does not result in engagement between components of the ride vehicle 82 (e.g., the support structure 84) and the forward or aft neighboring panels 246, 248.

In an embodiment, the controller 234 may control adjustment of the panels 202 (e.g., transition the panels 202 between the extended and retracted positions 206, 208) based on feedback from respective tracking sensors 242 coupled to each of the panels 202 in addition to, or in lieu of, the feedback from respective sensors 256 associated with each panel 202. For example, in some embodiments, the sensors 256 may include inductive sensors, photoelectric sensors, ultrasonic sensors, various other proximity sensors, radio frequency (RF) modules, or a combination thereof. The sensors 256 may be configured to detect the ride vehicle 82 as the ride vehicle 82 enters or approaches the loading path 36. For example, the sensors 256 may be configured to detect the support structure 84 of the robotic manipulator 80 as the ride vehicle 82 enters or approaches the loading path 36. That is, the sensors 256 may be configured to determine whether the support structure 84 and/or another suitable component of the ride vehicle 82 is within a threshold distance of a corresponding panel 202. Upon determining that the ride vehicle 82 is within the threshold distance of a particular panel 202, the controller 234 may transition the particular panel 202 and, in some embodiments, one or more neighboring panels 202, from the extended position 206 to the retracted position 208. In this manner, the controller 234 permits the support structure 84 to extend through an uncovered section of the gap 30 (e.g., the space 244) when entering the loading path 36. As such, the transport 70, in cooperation with the robotic manipulator 80, may propel the ride vehicle 82 along the loading path 36, while sections of the gap 30 positioned forward and rearward of the chassis 128 of the ride vehicle 82 remain covered and inaccessible to guests.

In certain embodiments, the controller 234 may continuously or periodically (e.g., after lapse of a predetermined time interval) monitor a position of the ride vehicle 82 along the loading path 36 (e.g., based on feedback from the tracking sensors 242 and/or the sensors 256). Upon determining that the ride vehicle 82 is exiting the loading path 36, such as when the ride vehicle 82 approaches or enters the exit avenue 62, the controller 234 may instruct the three panels 202 (e.g., the first, second, and third panels 250, 252, 254) to return to their respective extended positions 206. As an example, in some embodiments, the controller 234 may, via instructions sent to the corresponding actuators 230, extend the first panel 250, the second panel 252, and the third panel 254 to their respective extended positions 206 in a staggered or sequential manner.

In some embodiments, feedback from the sensors 256 permits the controller 234 to determine status information indicative of a position of one or more of the panels 202. Particularly, the status information may be indicative of whether individual panels 202 are in respective extended or retracted positions 206, 208. In some embodiments, the actuators 230 may be configured to provide the controller 234 with status information indicative of the positions of the panels 202 in addition to, or in lieu of, the sensors 256. Accordingly, the controller 234 may be configured to monitor a position of each of the panels 202 during operation of the loading system 12 using the status information. In some embodiments, the controller 234 may be configured to provide an alert to a ride technician or an operator of the ride system 10 upon determining that any of the panels 202 positioned in an abnormal or unexpected position. As an example, the controller 234 may generate an alert (e.g., an audible alert, an alert displayed on a display device viewable by the operator) upon determining that a particular panel 202 (e.g., the first panel 250) remains in the retracted position 208 after a ride vehicle 14 (e.g., the ride vehicle 82) previously adjacent to the panel 202 has exited the loading path 36.

As noted above, in some embodiments, certain of the panels 202 may be configured to translate circumferentially, instead of radially, along the turntable 18 to transition between respective extended and retracted positions 206, 208. As an example, the first panel 250 may be configured to translate circumferentially along the turntable 18 in the clockwise direction 22 to transition from its respective extended position 206 to a retracted position in which the first panel 250 is positioned above or below the forward neighboring panel 246. The third panel 254 may be configured to translate circumferentially along the turntable 18 in a counter-clockwise direction 258 to transition from its respective extended position 206 to a retracted position in which the third panel 254 is positioned above or below the aft neighboring panel 248.

Figure 11:
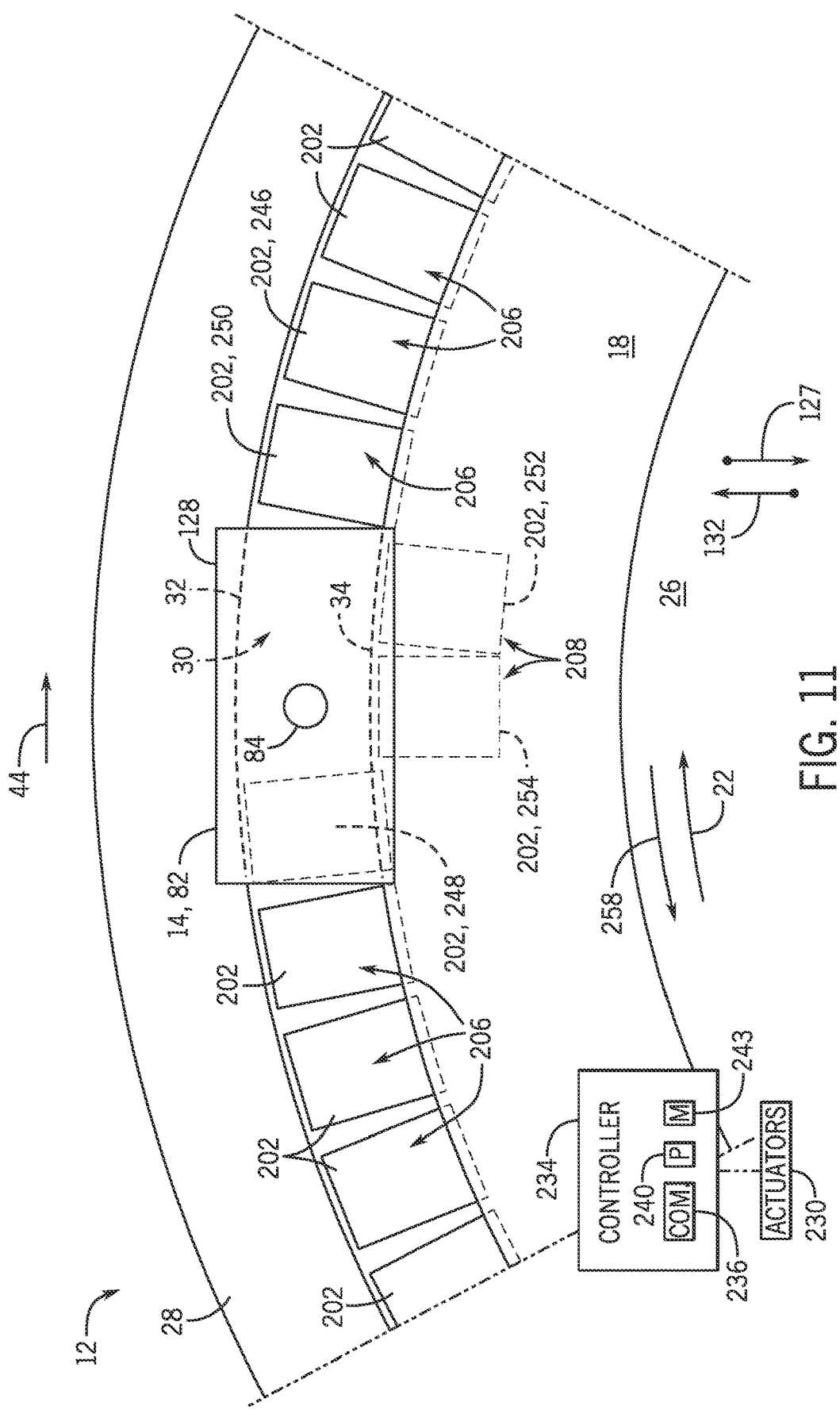
FIG. 11 is top view of an embodiment of a portion of a loading system for a ride system having an actuated panel assembly, in accordance with aspects of the present disclosure.

FIG. 11 is a schematic top view of an embodiment of a portion of the loading system 12. In some embodiments, the controller 234 may receive instructions (e.g., via inputs from the operator) to initiate a normal shutdown of the ride system 10, which will be referred to herein as a first braking scenario. When executing the first braking scenario, the controller 234 may gradually slow and stop movement of the ride vehicles 14 (e.g., via instructions sent to the transports 70) and of the turntable 18 (e.g., via instructions sent to a drive motor of the turntable 18) to suspend operation of the ride system 10. Particularly, the controller 234 may monitor a position of the ride vehicles 14 in the loading path 36 (e.g., via the sensors 242 and/or 256) relative to a position of the turntable 18 (e.g., monitored via sensors coupled to the turntable 18 and/or feedback from the drive motor of the turntable 18) to ensure that the ride vehicles 14 remain aligned at particular positions relative to the turntable 18 during execution of the first braking scenario. That is, the controller 234 may, based on acquired sensor feedback, ensure that a rotational speed of the turntable 18 about the axis 20 is reduced at a rate that is substantially similar to a rate by which a rotational speed of the ride vehicles 14 about the axis 20 (e.g., along the loading path 36) is reduced during execution of the first braking scenario.

In some embodiments, the ride system 10 may experience a disruption or abnormality in operation that may prompt the controller 234 to initiate a second braking scenario to more quickly stop movement of the ride vehicles 14 and of the turntable 18 to temporarily suspend operation of the ride system 10. In such embodiments, the ride vehicles 14 may be able to decelerate and cease movement in a time period that is less than a time period that may be involved to decelerate and cease movement of the rotating turntable 18 (e.g., due to differences in the inertia of individual ride vehicles 14 and the inertia of the turntable 18). As a result, the turntable 18 and the panels 202 may continue to move relative to the ride vehicles 14 positioned along the loading path 36 by a particular distance after the ride vehicles 14 have already stopped. That is, the turntable 18 may continue to rotate about the axis 20 in the clockwise direction 22 after the ride vehicles 14 have stopped moving along the loading path 36. This relative movement between the turntable 18 and a particular ride vehicle 14 in the loading path 36 (e.g., the ride vehicle 82) may expose a portion of the gap 30, referred to herein as an "exposed portion," which is typically covered by the chassis 128 of the ride vehicle 82 during normal operation of the ride system 10. As an example, the "exposed portion" of the gap 30 may be indicative of a portion of the gap 30 that is typically exposed (e.g., uncovered) by the first panel 250 but covered by the chassis 128 of the ride vehicle 82 during normal operation of the loading system 12.

In some embodiments, the controller 234 may be configured to determine a length of the exposed portion based on the relative position of the ride vehicle 82 to the turntable 18 (e.g., as determined via feedback from the sensors 242 and/or 256). If the length of the exposed portion exceeds a threshold value, the controller 234 may instruct one or more of the panels (e.g., the first panel 250) adjacent to the exposed portion to transition to the extended position 206 to cover the exposed portion of the gap 30. Accordingly, the controller 234 may ensure that substantially all of the gap 30 remains covered and inaccessible to guests during abnormal deactivation of the ride system 10. It should be understood that, in some embodiments, the controller 234 may instruct, for example, the first panel 250, to translate in the radially outward direction 132 from the respective retracted position 208 to the respective extended position 206 to cover the exposed portion of the gap 30. However, in other embodiments, the first panel 250 may translate circumferentially relative to the turntable 18 (e.g., in the counter-clockwise direction 258) from a respective retracted position beneath or above the forward neighboring panel 246 to the extended position 206 to cover the exposed portion of the gap 30 during and/or after execution of the second braking scenario.

In some embodiments, when undergoing the second braking scenario, the controller 234 may be configured monitor a position of an extended panel (e.g., the aft neighboring panel 248) positioned rearward of the support structure 84, with respect to the direction of travel 44 of the ride vehicle 82. In some embodiments, the controller 234 may send instructions to transition the aft neighboring panel 248 to its corresponding retracted position 208 upon determining that a distance between an edge of the aft neighboring panel 248 and the support structure 84 decreases below a threshold value during execution of the second braking scenario. Accordingly, the controller 234 may ensure that the aft neighboring panel 248 does not engage with the support structure 84 when the turntable 18 rotates relative to the ride vehicle 82 by a relatively large angular increment during the second braking scenario. In certain embodiments, the panels 202 may be configured to shear (e.g., decouple from the turntable 18) if the panels 202 unexpectedly engage with the support structure 84 and/or another portion of the ride vehicle 82. As discussed below, in certain embodiments, the controller 234 may be configured to send instructions to transition the forward neighboring panel 246 from the extended position 206 to the retracted position 208 if a distance between, for example, the support structure 84 and the forward neighboring panel 246 falls below a threshold value during execution of the second braking scenario.

It should be appreciated that, in some embodiments, the turntable 18 may be able to decelerate and cease movement in a time period that is less than a time period that may be involved to decelerate and cease movement of the ride vehicles 14 (e.g., due to a braking system included in the drive motor of the turntable 18). As a result, the ride vehicles 14 may continue to move along the loading path 36, relative to the turntable 18 and the panels 202, by a particular distance after the turntable 18 has already stopped. That is, the ride vehicles 14 may continue to travel along the loading path 36 about the axis 20 in the clockwise direction 22 after the turntable 18 has stopped moving about the axis 20 (e.g., in the clockwise direction 22). This relative movement between the turntable 18 and particular ride vehicles 14 in the loading path 36 (e.g., the ride vehicle 82) may expose a portion of the gap 30 aft of the ride vehicle 82 (e.g., with respect to a direction of movement of the ride vehicle 82) that is typically covered by the chassis 128 of the ride vehicle 82 during normal operation of the ride system 10. As such, in accordance with the techniques discussed above, the controller 234 may instruct one of the panels 202 (e.g., the third panel 254) adjacent to such an exposed portion of the gap 30 to transition to the extended position 206 to cover this exposed portion of the gap 30. Accordingly, the controller 234 may ensure that substantially all of the gap 30 remains covered and inaccessible to guests during abnormal deactivation of the ride system 10.

Moreover, in some embodiments, the controller 234 may be configured to transition the forward neighboring panel 246 from the extended position 206 to the retracted position 208 if a distance (e.g., as monitored by the sensors 242 and/or the sensors 246) between the support structure 84 or another component of the ride vehicle 82 and the forward neighboring panel 246 falls below a threshold value during execution of a braking scenario, such as the second braking scenario. To this end, the controller 234 may ensure that the ride vehicle 82 does not engage (e.g., contact) the forward neighboring panel 246 during execution of such braking procedures.

As set forth above, embodiments of the present disclosure may provide one or more technical effects useful for blocking access to portions of an amusement park attraction where guests may be likely to accidentally lose certain personal items. In particular, the embodiments of the gap blocking system 72 disclosed herein facilitate loading and unloading of passengers into non-stationary ride vehicles 14, while guest access to the gap 30 is substantially blocked. It should be understood that the technical effects and technical problems in the specification are examples and are not limiting. Indeed, it should be noted that the embodiments described in the specification may have other technical effects and can solve other technical problems and may be used outside of an amusement park setting.

While only certain features of present embodiments have been illustrated and described herein, many modifications and changes will occur to those skilled in the art. It is, therefore, to be understood that the appended claims are intended to cover all such modifications and changes that fall within the true spirit of the disclosure. Further, it should be understood that certain elements of the disclosed embodiments may be combined or exchanged with one another.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . ." or "step for [perform]ing [a function] . . .", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A gap blocking system, comprising:
a loading platform having a gap separating a first portion of the loading platform from a second portion of the loading platform;
a ride vehicle coupled to a transport extending through the gap, wherein the transport is configured to propel the ride vehicle along a loading path adjacent to the loading platform; and
a guardrail assembly comprising a plurality of guardrail units coupled to the first portion of the loading platform and configured to transition between a first position and a second position, wherein the plurality of guardrail units are configured to block access to the gap when in the first position, wherein the ride vehicle comprises an engagement feature configured to interface with an individual guardrail unit of the plurality of guardrail units to selectively transition the individual guardrail unit from the first position to the second position, and wherein the individual guardrail unit is configured to permit the ride vehicle to occupy a guest-accessible position adjacent to or on the loading platform in the second position.

2. The gap blocking system of claim 1, wherein the plurality of guardrail units are configured to extend generally vertically along an edge of the first portion of the loading platform in the first position, such that the plurality of guardrail units in the first position protrude above a surface of the first portion of the loading platform to block access to the gap.

3. The gap blocking system of claim 2, wherein the plurality of guardrail units are configured to subduct beneath the surface of the first portion of the loading platform to transition to the second position.

4. The gap blocking system of claim 1, comprising a plurality of track assemblies coupled to an underside of the first portion of the loading platform, wherein the individual guardrail unit of the plurality of guardrail units comprises a roller assembly configured to interface with a respective track assembly of the plurality of track assemblies to permit the individual guardrail unit to translate along the respective track assembly between the first position and the second position.

5. The gap blocking system of claim 4, wherein the plurality of track assemblies comprise respective springs configured to translate the plurality of guardrail units from the second position to the first position and respective dampers configured to limit a translation rate of the plurality of guardrail units from the second position to the first position.

6. The gap blocking system of claim 1, wherein the individual guardrail unit of the plurality of guardrail units comprises a plurality of rail segments pivotably coupled at hinge points, wherein the plurality of rail segments are configured to articulate relative to one another at the hinge points to facilitate transitioning of the individual guardrail unit from the first position to the second position, or vice versa.

7. The gap blocking system of claim 1, wherein the first portion of the loading platform is a turntable configured to rotate about an axis and the second portion is an outer platform disposed about the turntable.

8. The gap blocking system of claim 1, wherein the engagement feature is configured to sequentially engage with respective push plates of at least two guardrail units of the plurality of guardrail units to gradually transition the at least two guardrail units from the first position to the second position in a staggered manner.

* * * * *